(12) United States Patent
Gibson et al.

(10) Patent No.: US 11,474,489 B1
(45) Date of Patent: Oct. 18, 2022

(54) METHODS AND SYSTEMS FOR IMPROVING BUILDING PERFORMANCE

(71) Applicant: Honeywell International Inc., Charlotte, NC (US)

(72) Inventors: Adam Gibson, Brunswick (AU); Bhavesh Gupta, Niantic, CT (US); Manish Sharma, Alpharetta, GA (US); Rajkumar Palanivel, Eden Prairie, MN (US); Paul Willett, Charlotte, NC (US); Naveen Kumar Dindukurthi Sivaprasad, Bangalore (IN)

(73) Assignee: HONEYWELL INTERNATIONAL INC., Charlotte (NO)

( * ) Notice: Subject to any disclaimer, the term of this patent is extended or adjusted under 35 U.S.C. 154(b) by 0 days.

(21) Appl. No.: 17/215,626

(22) Filed: Mar. 29, 2021

(51) Int. Cl.
*G05B 19/042* (2006.01)

(52) U.S. Cl.
CPC .. *G05B 19/042* (2013.01); *G05B 2219/24015* (2013.01); *G05B 2219/25011* (2013.01)

(58) Field of Classification Search
CPC ........ G05B 19/042; G05B 2219/24015; G05B 2219/25011
See application file for complete search history.

(56) References Cited

U.S. PATENT DOCUMENTS

| | | |
|---|---|---|
| 191,512 A | 6/1877 | Bennett et al. |
| 4,009,647 A | 3/1977 | Howorth |
| 4,375,637 A | 3/1983 | Desjardins |
| 4,918,615 A | 4/1990 | Suzuki et al. |
| 4,939,922 A | 7/1990 | Smalley et al. |
| 5,566,084 A | 10/1996 | Cmar |
| 5,727,579 A | 3/1998 | Chardack |
| 5,745,126 A | 4/1998 | Jain et al. |
| 5,751,916 A | 5/1998 | Kon et al. |
| 5,777,598 A | 7/1998 | Gowda et al. |
| 5,973,662 A | 10/1999 | Singers et al. |

(Continued)

FOREIGN PATENT DOCUMENTS

| | | |
|---|---|---|
| CA | 2387100 A1 | 11/2003 |
| CA | 2538139 A1 | 3/2005 |

(Continued)

OTHER PUBLICATIONS

Bocicor et al. "Wireless Sensor Network based System for the Prevention of Hospital Acquired Infections", arxiv.org, Cornell University Ithaca, NY 14853, May 2, 2017, XP080947042, (Abstract).

(Continued)

*Primary Examiner* — Mohammad Ali
*Assistant Examiner* — Sheela Rao
(74) *Attorney, Agent, or Firm* — Seager, Tufte & Wickhem, LLP

(57) ABSTRACT

A kit includes hand-held sensors that are each configured to measure one or more of the healthy building parameters and a portable device that is configured to capture the measured current values of the one or more of the healthy building parameters that were measured using the hand-held sensors and to determine a healthy building score and one or more recommendations for improving the healthy building score of the building. The portable device is configured to output the healthy building score and the one or more recommendations for improving the healthy building score of the building via a user interface of the portable device.

19 Claims, 14 Drawing Sheets

(56) References Cited

U.S. PATENT DOCUMENTS

| | | | |
|---|---|---|---|
| 6,065,842 A | 5/2000 | Fink | |
| 6,139,177 A | 10/2000 | Venkatraman et al. | |
| 6,144,993 A | 11/2000 | Fukunaga et al. | |
| 6,157,943 A | 12/2000 | Meyer | |
| 6,229,429 B1 | 5/2001 | Horan | |
| 6,238,337 B1 | 5/2001 | Kambhatla et al. | |
| 6,334,211 B1 | 12/2001 | Kojima et al. | |
| 6,353,853 B1 | 3/2002 | Gravlin | |
| 6,369,695 B1 | 4/2002 | Horon | |
| 6,375,038 B1 | 4/2002 | Daansen et al. | |
| 6,429,868 B1 | 8/2002 | Dehner, Jr. et al. | |
| 6,473,084 B1 | 10/2002 | Phillips et al. | |
| 6,487,457 B1 | 11/2002 | Hull et al. | |
| 6,580,950 B1 | 6/2003 | Johnson et al. | |
| 6,598,056 B1 | 7/2003 | Hull et al. | |
| 6,619,555 B2 | 9/2003 | Rosen | |
| 6,704,012 B1 | 3/2004 | Lefave | |
| 6,720,874 B2 | 4/2004 | Fufido et al. | |
| 6,741,915 B2 | 5/2004 | Poth | |
| 6,796,896 B2 | 9/2004 | Laiti | |
| 6,801,199 B1 | 10/2004 | Wallman | |
| 6,816,878 B1 | 11/2004 | Zimmers et al. | |
| 6,876,951 B2 | 4/2005 | Skidmore et al. | |
| 6,882,278 B2 | 4/2005 | Winings et al. | |
| 6,904,385 B1 | 6/2005 | Budike, Jr. | |
| 6,907,387 B1 | 6/2005 | Reardon | |
| 6,911,177 B2 | 6/2005 | Deal | |
| 6,993,403 B1 | 1/2006 | Dadebo et al. | |
| 6,993,417 B2 | 1/2006 | Osann, Jr. | |
| 7,023,440 B1 | 4/2006 | Havekost et al. | |
| 7,031,880 B1 | 4/2006 | Seem et al. | |
| 7,062,722 B1 | 6/2006 | Carlin et al. | |
| 7,110,843 B2 | 9/2006 | Pagnano et al. | |
| 7,139,685 B2 | 11/2006 | Bascle et al. | |
| 7,164,972 B2 | 1/2007 | Imhof et al. | |
| 7,183,899 B2 | 2/2007 | Behnke | |
| 7,200,639 B1 | 4/2007 | Yoshida | |
| 7,222,111 B1 | 5/2007 | Budike, Jr. | |
| 7,222,800 B2 | 5/2007 | Wruck | |
| 7,257,397 B2 | 8/2007 | Shamoon et al. | |
| 7,280,030 B1 | 10/2007 | Monaco | |
| 7,292,908 B2 | 11/2007 | Borne et al. | |
| 7,295,116 B2 | 11/2007 | Kumar et al. | |
| 7,302,313 B2 | 11/2007 | Sharp et al. | |
| 7,308,323 B2 | 12/2007 | Kruk et al. | |
| 7,308,388 B2 | 12/2007 | Beverina et al. | |
| 7,313,447 B2 | 12/2007 | Hsiung et al. | |
| 7,346,433 B2 | 3/2008 | Budike, Jr. | |
| 7,356,548 B1 | 4/2008 | Culp et al. | |
| 7,379,782 B1 | 5/2008 | Cocco | |
| 7,383,148 B2 | 6/2008 | Ahmed | |
| 7,434,742 B2 | 10/2008 | Mueller et al. | |
| 7,447,333 B1 | 11/2008 | Masticola et al. | |
| 7,466,224 B2 | 12/2008 | Ward et al. | |
| 7,496,472 B2 | 2/2009 | Seem | |
| 7,512,450 B2 | 3/2009 | Ahmed | |
| 7,516,490 B2 | 4/2009 | Riordan et al. | |
| 7,548,833 B2 | 6/2009 | Ahmed | |
| 7,551,092 B1 | 6/2009 | Henry | |
| 7,557,729 B2 | 7/2009 | Hubbard et al. | |
| 7,567,844 B2 | 7/2009 | Thomas et al. | |
| 7,596,473 B2 | 9/2009 | Hansen et al. | |
| 7,610,910 B2 | 11/2009 | Ahmed | |
| 7,626,507 B2 | 12/2009 | LaCasse | |
| 7,664,574 B2 | 2/2010 | Imhof et al. | |
| 7,682,464 B2 | 3/2010 | Glenn et al. | |
| 7,702,421 B2 | 4/2010 | Sullivan et al. | |
| 7,729,882 B2 | 6/2010 | Seem | |
| 7,755,494 B2 | 7/2010 | Melker et al. | |
| 7,761,310 B2 | 7/2010 | Rodgers | |
| 7,774,227 B2 | 8/2010 | Srivastava | |
| 7,797,188 B2 | 9/2010 | Srivastava | |
| 7,819,136 B1 | 10/2010 | Eddy | |
| 7,822,806 B2 | 10/2010 | Frank et al. | |
| 7,856,370 B2 | 12/2010 | Katta et al. | |
| 7,978,083 B2 | 7/2011 | Melker et al. | |
| 7,984,384 B2 | 7/2011 | Chaudhri et al. | |
| 7,986,323 B2 | 7/2011 | Kobayashi et al. | |
| 8,024,666 B2 | 9/2011 | Thompson | |
| 8,086,047 B2 | 12/2011 | Penke et al. | |
| 8,099,178 B2 | 1/2012 | Mairs et al. | |
| 8,151,280 B2 | 4/2012 | Sather et al. | |
| 8,176,095 B2 | 5/2012 | Murray et al. | |
| 8,218,871 B2 | 7/2012 | Angell et al. | |
| 8,219,660 B2 | 7/2012 | McCoy et al. | |
| 8,271,941 B2 | 9/2012 | Zhang et al. | |
| 8,294,585 B2 | 10/2012 | Barnhill | |
| 8,302,020 B2 | 10/2012 | Louch et al. | |
| 8,320,634 B2 | 11/2012 | Deutsch | |
| 8,334,422 B2 | 12/2012 | Gutsol et al. | |
| 8,344,893 B1 | 1/2013 | Drammeh | |
| 8,375,118 B2 | 2/2013 | Hao et al. | |
| 8,476,590 B2 | 7/2013 | Stratmann et al. | |
| 8,516,016 B2 | 8/2013 | Park et al. | |
| 8,558,660 B2 | 10/2013 | Nix et al. | |
| 8,639,527 B2 | 1/2014 | Rensvold et al. | |
| 8,698,637 B2 | 4/2014 | Raichman | |
| 8,756,024 B2 | 6/2014 | Hedley et al. | |
| 8,816,860 B2 | 8/2014 | Ophardt et al. | |
| 8,869,027 B2 | 10/2014 | Louch et al. | |
| 8,904,497 B2 | 12/2014 | Hsieh | |
| 8,936,944 B2 | 1/2015 | Peltz et al. | |
| 8,947,437 B2 | 2/2015 | Garr et al. | |
| 8,950,019 B2 | 2/2015 | Loberger et al. | |
| 9,000,926 B2 | 4/2015 | Hollock et al. | |
| 9,030,325 B2 | 5/2015 | Taneff | |
| 9,098,738 B2 | 8/2015 | Bilet et al. | |
| 9,105,071 B2 | 8/2015 | Fletcher et al. | |
| 9,175,356 B2 | 11/2015 | Peltz et al. | |
| 9,240,111 B2 | 1/2016 | Scott et al. | |
| 9,280,884 B1 | 3/2016 | Schultz et al. | |
| 9,292,972 B2 | 3/2016 | Hailemariam et al. | |
| 9,320,662 B2 | 4/2016 | Hayes et al. | |
| 9,370,600 B1 | 6/2016 | DuPuis et al. | |
| 9,373,242 B1 | 6/2016 | Conrad et al. | |
| 9,396,638 B2 | 7/2016 | Wildman et al. | |
| 9,311,807 B2 | 8/2016 | Schultz et al. | |
| 9,406,212 B2 | 8/2016 | De Luca et al. | |
| 9,418,535 B1 | 8/2016 | Felch et al. | |
| 9,418,536 B1 | 8/2016 | Felch et al. | |
| 9,449,219 B2 | 9/2016 | Bilet et al. | |
| 9,477,543 B2 | 10/2016 | Henley et al. | |
| 9,497,832 B2 | 11/2016 | Verberkt et al. | |
| 9,513,364 B2 | 12/2016 | Hall et al. | |
| 9,526,380 B2 | 12/2016 | Hamilton et al. | |
| 9,526,806 B2 | 12/2016 | Park et al. | |
| 9,536,415 B2 | 1/2017 | De Luca et al. | |
| 9,558,648 B2 | 1/2017 | Douglas | |
| 9,591,267 B2 | 3/2017 | Lipton et al. | |
| 9,613,518 B2 | 4/2017 | Dunn et al. | |
| 9,618,224 B2 | 4/2017 | Emmons et al. | |
| 9,640,059 B2 | 5/2017 | Hyland | |
| 9,672,360 B2 | 6/2017 | Barkan | |
| 9,710,700 B2 | 7/2017 | Bilet et al. | |
| 9,715,242 B2 | 7/2017 | Pillai et al. | |
| 9,721,452 B2 | 8/2017 | Felch et al. | |
| 9,729,945 B2 | 8/2017 | Schultz et al. | |
| 9,784,464 B2 | 10/2017 | Yamamoto et al. | |
| 9,843,743 B2 | 12/2017 | Lewis et al. | |
| 9,856,634 B2 | 1/2018 | Rodenbeck et al. | |
| 9,872,088 B2 | 1/2018 | Fadell et al. | |
| 9,875,639 B2 | 1/2018 | Bone et al. | |
| 9,911,312 B2 | 3/2018 | Wildman et al. | |
| 9,940,819 B2 | 4/2018 | Ferniany | |
| 9,956,306 B2 | 5/2018 | Brais et al. | |
| 9,986,175 B2 | 5/2018 | Frank et al. | |
| 10,087,608 B2 | 10/2018 | Dobizl et al. | |
| 10,223,894 B2 | 3/2019 | Raichman | |
| 10,228,837 B2 | 3/2019 | Hua et al. | |
| 10,235,865 B2 | 3/2019 | Thyroff | |
| 10,251,610 B2 | 4/2019 | Parthasarathy et al. | |
| 10,303,843 B2 | 5/2019 | Bitran et al. | |
| 10,332,382 B2 | 6/2019 | Thyroff | |
| 10,514,817 B2 | 12/2019 | Hua et al. | |

(56) References Cited

U.S. PATENT DOCUMENTS

| | | |
|---|---|---|
| 10,565,844 B2 | 2/2020 | Pourmohammad et al. |
| 10,602,474 B2 | 3/2020 | Goldstein |
| 10,607,147 B2 | 3/2020 | Raykov et al. |
| 2002/0111698 A1 | 8/2002 | Graziano et al. |
| 2002/0130868 A1 | 9/2002 | Smith |
| 2003/0028269 A1 | 2/2003 | Spriggs et al. |
| 2003/0030637 A1 | 2/2003 | Grinstein et al. |
| 2003/0046862 A1 | 3/2003 | Wolf et al. |
| 2003/0071814 A1 | 4/2003 | Jou et al. |
| 2003/0078677 A1 | 4/2003 | Hull et al. |
| 2003/0083957 A1 | 5/2003 | Olefson |
| 2003/0103075 A1 | 6/2003 | Rosselot |
| 2003/0171851 A1 | 9/2003 | Brickfield et al. |
| 2003/0214400 A1 | 11/2003 | Mizutani et al. |
| 2003/0233432 A1 | 12/2003 | Davis et al. |
| 2004/0001009 A1 | 1/2004 | Winings et al. |
| 2004/0064260 A1 | 4/2004 | Padmanabhan et al. |
| 2004/0143474 A1 | 7/2004 | Haeberle et al. |
| 2004/0153437 A1 | 8/2004 | Buchan |
| 2004/0168115 A1 | 8/2004 | Bauernschmidt et al. |
| 2004/0233192 A1 | 11/2004 | Hopper |
| 2004/0260411 A1 | 12/2004 | Cannon |
| 2004/0267560 A1 | 12/2004 | Hostland |
| 2005/0010460 A1 | 1/2005 | Mizoguchi et al. |
| 2005/0119767 A1 | 6/2005 | Kiwimagi et al. |
| 2005/0143863 A1 | 6/2005 | Ruane et al. |
| 2005/0267900 A1 | 12/2005 | Ahmed et al. |
| 2006/0004841 A1 | 1/2006 | Heikkonen et al. |
| 2006/0009862 A1 | 1/2006 | Imhof et al. |
| 2006/0017547 A1 | 1/2006 | Buckingham et al. |
| 2006/0020177 A1 | 1/2006 | Seo et al. |
| 2006/0028471 A1 | 2/2006 | Kincaid et al. |
| 2006/0029256 A1 | 2/2006 | Miyoshi et al. |
| 2006/0058900 A1 | 3/2006 | Johanson et al. |
| 2006/0067545 A1 | 3/2006 | Lewis et al. |
| 2006/0067546 A1 | 3/2006 | Lewis et al. |
| 2006/0077255 A1 | 4/2006 | Cheng |
| 2006/0184326 A1 | 8/2006 | McNally et al. |
| 2006/0231568 A1 | 10/2006 | Lynn et al. |
| 2006/0265664 A1 | 11/2006 | Simons et al. |
| 2006/0279630 A1 | 12/2006 | Aggarwal et al. |
| 2007/0016955 A1 | 1/2007 | Goldberg et al. |
| 2007/0055757 A1 | 3/2007 | Mairs et al. |
| 2007/0055760 A1 | 3/2007 | McCoy et al. |
| 2007/0061046 A1 | 3/2007 | Mairs et al. |
| 2007/0067062 A1 | 3/2007 | Mairs et al. |
| 2007/0088534 A1 | 4/2007 | MacArthur et al. |
| 2007/0090951 A1 | 4/2007 | Chan et al. |
| 2007/0091091 A1 | 4/2007 | Gardiner et al. |
| 2007/0101433 A1 | 5/2007 | Louch et al. |
| 2007/0114295 A1 | 5/2007 | Jenkins |
| 2007/0120652 A1 | 5/2007 | Behnke |
| 2007/0139208 A1 | 6/2007 | Kates |
| 2007/0216682 A1 | 9/2007 | Navratil et al. |
| 2007/0219645 A1 | 9/2007 | Thomas et al. |
| 2007/0239484 A1 | 10/2007 | Arond et al. |
| 2007/0268122 A1 | 11/2007 | Kow et al. |
| 2008/0001763 A1 | 1/2008 | Raja et al. |
| 2008/0027885 A1 | 1/2008 | Van Putten et al. |
| 2008/0036593 A1 | 2/2008 | Rose-Pehrsson et al. |
| 2008/0062167 A1 | 3/2008 | Boggs et al. |
| 2008/0099045 A1 | 5/2008 | Glenn et al. |
| 2008/0103798 A1 | 5/2008 | Domenikos et al. |
| 2008/0120396 A1 | 5/2008 | Jayaram et al. |
| 2008/0144885 A1 | 6/2008 | Zucherman et al. |
| 2008/0183424 A1 | 7/2008 | Seem |
| 2008/0194009 A1 | 8/2008 | Marentis |
| 2008/0198231 A1 | 8/2008 | Ozdemir et al. |
| 2008/0209342 A1 | 8/2008 | Taylor et al. |
| 2008/0222565 A1 | 9/2008 | Taylor et al. |
| 2008/0224862 A1 | 9/2008 | Cirker |
| 2008/0242945 A1 | 10/2008 | Gugliotti et al. |
| 2008/0250800 A1 | 10/2008 | Wetzel |
| 2008/0279420 A1 | 11/2008 | Masticola et al. |
| 2008/0280275 A1 | 11/2008 | Collopy |
| 2008/0303658 A1 | 12/2008 | Melker et al. |
| 2008/0306985 A1 | 12/2008 | Murray et al. |
| 2008/0320552 A1 | 12/2008 | Kumar et al. |
| 2009/0001181 A1 | 1/2009 | Siddaramanna et al. |
| 2009/0024944 A1 | 1/2009 | Louch et al. |
| 2009/0065596 A1 | 3/2009 | Seem et al. |
| 2009/0083120 A1 | 3/2009 | Strichman et al. |
| 2009/0096791 A1 | 4/2009 | Abshear et al. |
| 2009/0125337 A1 | 5/2009 | Abr |
| 2009/0125825 A1 | 5/2009 | Rye et al. |
| 2009/0144023 A1 | 6/2009 | Seem |
| 2009/0157744 A1 | 6/2009 | McConnell |
| 2009/0160673 A1 | 6/2009 | Cirker |
| 2009/0322782 A1 | 12/2009 | Kimchi et al. |
| 2010/0048167 A1 | 2/2010 | Chow et al. |
| 2010/0058248 A1 | 3/2010 | Park |
| 2010/0064001 A1 | 3/2010 | Daily |
| 2010/0070089 A1 | 3/2010 | Harrod et al. |
| 2010/0073162 A1 | 3/2010 | Johnson et al. |
| 2010/0123560 A1 | 5/2010 | Nix et al. |
| 2010/0134296 A1 | 6/2010 | Hwang |
| 2010/0156628 A1 | 6/2010 | Ainsbury et al. |
| 2010/0156630 A1 | 6/2010 | Ainsbury |
| 2010/0188228 A1 | 7/2010 | Hyland |
| 2010/0223198 A1 | 9/2010 | Noureldin et al. |
| 2010/0249955 A1 | 9/2010 | Sitton |
| 2010/0286937 A1 | 11/2010 | Hedley et al. |
| 2010/0318200 A1 | 12/2010 | Foslien et al. |
| 2010/0324962 A1 | 12/2010 | Nesler et al. |
| 2011/0010654 A1 | 1/2011 | Raymond et al. |
| 2011/0057799 A1 | 3/2011 | Taneff |
| 2011/0077779 A1 | 3/2011 | Fuller et al. |
| 2011/0083094 A1 | 4/2011 | Laycock et al. |
| 2011/0087988 A1 | 4/2011 | Ray et al. |
| 2011/0112854 A1 | 5/2011 | Koch et al. |
| 2011/0126111 A1 | 5/2011 | Gill et al. |
| 2011/0154426 A1 | 6/2011 | Doser et al. |
| 2011/0161124 A1 | 6/2011 | Lappinga et al. |
| 2011/0169646 A1 | 7/2011 | Raichman |
| 2011/0184563 A1 | 7/2011 | Foslien et al. |
| 2011/0202467 A1 | 8/2011 | Hilber et al. |
| 2011/0273298 A1 | 11/2011 | Snodgrass et al. |
| 2011/0291841 A1 | 12/2011 | Hollock et al. |
| 2011/0298301 A1 | 12/2011 | Wong et al. |
| 2011/0316703 A1 | 12/2011 | Butler et al. |
| 2011/0320054 A1 | 12/2011 | Brzezowski |
| 2012/0022700 A1 | 1/2012 | Drees et al. |
| 2012/0039503 A1 | 2/2012 | Chen et al. |
| 2012/0062382 A1 | 3/2012 | Taneff |
| 2012/0075464 A1 | 3/2012 | Derenne et al. |
| 2012/0109988 A1 | 5/2012 | Li et al. |
| 2012/0112883 A1 | 5/2012 | Wallace et al. |
| 2012/0131217 A1 | 5/2012 | Delorme et al. |
| 2012/0158185 A1 | 6/2012 | El-Mankabady et al. |
| 2012/0216243 A1 | 8/2012 | Gill et al. |
| 2012/0224057 A1 | 9/2012 | Gill et al. |
| 2012/0259466 A1 | 10/2012 | Ray et al. |
| 2012/0262472 A1 | 10/2012 | Garr et al. |
| 2012/0272146 A1 | 10/2012 | D'souza et al. |
| 2012/0291068 A1 | 11/2012 | Khushoo et al. |
| 2012/0303652 A1 | 11/2012 | Tseng |
| 2012/0310418 A1 | 12/2012 | Harrod et al. |
| 2013/0055132 A1 | 2/2013 | Foslien |
| 2013/0060794 A1 | 3/2013 | Puttabasappa et al. |
| 2013/0082842 A1 | 4/2013 | Balazs et al. |
| 2013/0086152 A1 | 4/2013 | Hersche et al. |
| 2013/0091631 A1 | 4/2013 | Hayes et al. |
| 2013/0110295 A1 | 5/2013 | Zheng et al. |
| 2013/0169681 A1 | 7/2013 | Rasane et al. |
| 2013/0184880 A1 | 7/2013 | McMahon |
| 2013/0187775 A1 | 7/2013 | Marsden et al. |
| 2013/0204570 A1 | 8/2013 | Mendelson et al. |
| 2013/0229276 A1 | 9/2013 | Hunter |
| 2013/0268293 A1 | 10/2013 | Knudson et al. |
| 2013/0289774 A1 | 10/2013 | Day et al. |
| 2013/0338837 A1 | 12/2013 | Hublou et al. |
| 2014/0032157 A1 | 1/2014 | Khiani |
| 2014/0040998 A1 | 2/2014 | Hsieh |
| 2014/0046490 A1 | 2/2014 | Foslien et al. |

(56) References Cited

U.S. PATENT DOCUMENTS

| | | |
|---|---|---|
| 2014/0046722 A1 | 2/2014 | Rosenbloom et al. |
| 2014/0058539 A1 | 2/2014 | Park |
| 2014/0167917 A2 | 6/2014 | Wallace et al. |
| 2014/0207291 A1 | 7/2014 | Golden et al. |
| 2014/0207693 A1 | 7/2014 | Horst et al. |
| 2014/0292518 A1 | 10/2014 | Wildman et al. |
| 2014/0307076 A1 | 10/2014 | Deutsch |
| 2014/0309757 A1 | 10/2014 | Le Sant et al. |
| 2014/0316582 A1 | 10/2014 | Berg-Sonne et al. |
| 2014/0320289 A1 | 10/2014 | Raichman |
| 2014/0342724 A1 | 11/2014 | Hill et al. |
| 2015/0025329 A1 | 1/2015 | Amarasingham et al. |
| 2015/0032264 A1 | 1/2015 | Emmons et al. |
| 2015/0056909 A1 | 2/2015 | Chien |
| 2015/0070174 A1 | 3/2015 | Douglas |
| 2015/0077258 A1 | 3/2015 | Nelson et al. |
| 2015/0113462 A1 | 4/2015 | Chen et al. |
| 2015/0153918 A1 | 6/2015 | Chen et al. |
| 2015/0161874 A1 | 6/2015 | Thyroff et al. |
| 2015/0167995 A1 | 6/2015 | Fadell et al. |
| 2015/0168949 A1 | 6/2015 | Hua et al. |
| 2015/0194043 A1 | 7/2015 | Dunn et al. |
| 2015/0198707 A1 | 7/2015 | Al-Alusi |
| 2015/0212717 A1 | 7/2015 | Nair et al. |
| 2015/0213222 A1 | 7/2015 | Amarasingham et al. |
| 2015/0213379 A1 | 7/2015 | Nair et al. |
| 2015/0216369 A1 | 8/2015 | Hamilton et al. |
| 2015/0253748 A1 | 9/2015 | Brun et al. |
| 2015/0281287 A1 | 10/2015 | Gill et al. |
| 2016/0033946 A1 | 2/2016 | Zhu et al. |
| 2016/0061476 A1 | 3/2016 | Schultz et al. |
| 2016/0061477 A1 | 3/2016 | Schultz et al. |
| 2016/0061794 A1 | 3/2016 | Schultz et al. |
| 2016/0061795 A1 | 3/2016 | Schultz et al. |
| 2016/0063833 A1 | 3/2016 | Schultz et al. |
| 2016/0066067 A1 | 3/2016 | Schultz et al. |
| 2016/0116181 A1 | 4/2016 | Aultman et al. |
| 2016/0139067 A1 | 5/2016 | Grace |
| 2016/0253897 A1 | 9/2016 | Wildman et al. |
| 2016/0255516 A1 | 9/2016 | Hill et al. |
| 2016/0298864 A1 | 10/2016 | Ekolind et al. |
| 2016/0306934 A1 | 10/2016 | Sperry et al. |
| 2016/0314683 A1 | 10/2016 | Felch et al. |
| 2016/0328948 A1 | 11/2016 | Ferniany |
| 2016/0335731 A1 | 11/2016 | Hall |
| 2016/0367925 A1 | 12/2016 | Blackley |
| 2017/0024986 A1 | 1/2017 | Austin |
| 2017/0193792 A1 | 7/2017 | Bermudez Rodriguez et al. |
| 2017/0256155 A1 | 9/2017 | Sengstaken, Jr. |
| 2017/0280949 A1 | 10/2017 | Wildman et al. |
| 2017/0294106 A1 | 10/2017 | Thyroff |
| 2017/0365024 A1 | 12/2017 | Koch et al. |
| 2018/0016773 A1 | 1/2018 | Chandler et al. |
| 2018/0151054 A1 | 5/2018 | Pi |
| 2018/0218591 A1 | 8/2018 | Easter |
| 2018/0293038 A1 | 10/2018 | Meruva et al. |
| 2018/0301014 A1 | 10/2018 | Worral et al. |
| 2018/0313695 A1 | 11/2018 | Shim et al. |
| 2018/0365957 A1 | 12/2018 | Wright et al. |
| 2019/0051138 A1 | 2/2019 | Easter |
| 2019/0139395 A1 | 5/2019 | Rogachev et al. |
| 2019/0209719 A1 | 7/2019 | Andersen et al. |
| 2019/0346417 A1 | 11/2019 | Benefield |
| 2020/0009280 A1 | 1/2020 | Kupa et al. |
| 2020/0074836 A1 | 3/2020 | Kolavennu et al. |
| 2020/0090089 A1 | 3/2020 | Aston et al. |
| 2020/0146557 A1 | 5/2020 | Cheung et al. |
| 2020/0200420 A1 | 6/2020 | Nayak et al. |

FOREIGN PATENT DOCUMENTS

| | | |
|---|---|---|
| CN | 103110410 A | 5/2013 |
| CN | 103970977 A | 8/2014 |
| CN | 105116848 A | 12/2015 |
| CN | 108961714 A | 12/2018 |
| CN | 110009245 A | 7/2019 |
| CN | 110084928 A | 8/2019 |
| CN | 110827457 A | 2/2020 |
| EP | 1390742 A2 | 2/2004 |
| EP | 1669912 A1 | 6/2006 |
| EP | 2310981 A1 | 4/2011 |
| JP | 7085166 A | 3/1995 |
| JP | 11024735 A | 1/1999 |
| JP | 11317936 A | 11/1999 |
| JP | 2001356813 A | 12/2001 |
| JP | 2005242531 A | 9/2005 |
| JP | 2005311563 A | 11/2005 |
| KR | 1172747 B1 | 8/2012 |
| KR | 101445367 B1 | 10/2014 |
| KR | 1499081 B1 | 3/2015 |
| WO | 9621264 A3 | 11/1996 |
| WO | 2004029518 A1 | 4/2004 |
| WO | 2005045715 A2 | 5/2005 |
| WO | 2008152433 A1 | 12/2008 |
| WO | 2008157755 A1 | 12/2008 |
| WO | 2009012319 A2 | 1/2009 |
| WO | 2009079648 A1 | 6/2009 |
| WO | 2010106474 A1 | 9/2010 |
| WO | 2011025085 A1 | 3/2011 |
| WO | 2011043732 A1 | 4/2011 |
| WO | 2011057173 A2 | 5/2011 |
| WO | 2011123743 A1 | 10/2011 |
| WO | 2013062725 A1 | 5/2013 |
| WO | 2013178819 A1 | 12/2013 |
| WO | 2014009291 A1 | 1/2014 |
| WO | 2014098861 A1 | 6/2014 |
| WO | 2014135517 A1 | 9/2014 |
| WO | 2016123536 A1 | 8/2016 |
| WO | 2017057274 A1 | 4/2017 |
| WO | 2019046580 A1 | 3/2019 |
| WO | 2019213457 A1 | 11/2019 |
| WO | 2020024553 A1 | 2/2020 |
| WO | 2021011589 A1 | 1/2021 |

OTHER PUBLICATIONS

Shhedi et al., "Traditional and ICT Solutions for Preventing the Hospital Acquired Infection", 2015 20th International Conference on Control Systems and Computer Science, IEEE, May 27, 2015, pp. 867-873, XP033188038.
Extended European Search Report, EP application No. 20151295.1, p. 13, May 26, 2020.
U.S. Appl. No. 14/109,496, filed Dec. 17, 2013.
"What is the GE Nucleus Home Manager? How can a Home Manager Help with Energy Conservation?" GE Nucleus, 2 pages, printed Jan. 15, 2013. www.geappliances.com/home-energy-manager/about-energy-monitors.htm.
"Lucid Design Group—Building Dashboard Network—Apps," 7 pages, Jan. 15, 2013. www.luciddesigngroup.com/network/apps.php#homepage.
Preuveneers et al., "Intelligent Widgets for Intuitive Interaction and Coordination in Smart Home Environments," IEEE Eighth International Conference on Intelligent Environments, pp. 157-164, 2012.
Wu et al., "A Web 2.0 Based Scientific Application Framework," 7 pages, prior to Jul. 24, 2014.
"The Home Dashboard," CRBM info@hand website, 46 pages, prior to Apr. 25, 2013.
"Free Facilities Dashboards," eSight Energy Website, 2 pages, prior to Apr. 25, 2013.
Merton Building Controls, Gallery Prints, 7 pages, Dec. 19, 2013.
Carter, "Industrial Energy Management Dashboards Require a Toolkit," Cross Automation, 11 pages, Nov. 4, 2013.
U.S. Appl. No. 14/169,071, filed Jan. 30, 2014.
U.S. Appl. No. 14/169,083, filed Jan. 30, 2014.
U.S. Appl. No. 14/461,188, filed Aug. 15, 2014.
U.S. Appl. No. 14/482,607, filed Sep. 10, 2014.
E-homecontrols.com, "e-Home Controls Website," link to actual website no longer works, 1 page, prior to Dec. 19, 2013.

(56) References Cited

OTHER PUBLICATIONS

"C&C (/)—Omniboard," 5 pages, Dec. 19, 2013. http://www.ccbac.com.
"DomController Home Automation Software—Control Anything from Anywhere," 11 pages, printed Jan. 6, 2015. http://www.domcontroller.com/en/.
"Novar OPUS BAS," 1 page, prior to Feb. 13, 2013. http://www.novar.com/ems-bas/opus-building-automation-system.
"A 3D Interactive Environment for Automated Building Control," Master's Dissertation, Instituto Superior Tecnico, 120 pages, Nov. 2012.
Panduit Corp., "Enable a Building Automation with Panduit Enterprise Solutions," 4 pages, Nov. 2012.
Honeywell, "WEBs-AX Web-Enabled Building Solutions," sales brochure, Honeywell International Inc., Mar. 2009.
Honeywell, "Attune Advisory Services," press release, Honeywell International Inc., Mar. 20, 2012.
EnteliWEB Overview, web pages retrieved on May 9, 2013 from http://deltacontrols.com/products/facilities-management/supervisory-software et seq. by the Internet Archive at web.archive.org.
"BACnet Protocol Implementation Conformance Statement" for enteliWEB, Delta Controls, Jul. 17, 2013.
Castle, "7 Software Platforms that Make Building Energy Management Easy," http://greentechadvocates.com/2012/11/28/7-software-platforms-that-make-building-energy-managment-easy/, Nov. 28, 2012.
EnteliWEB "Software: Enterprise Energy Management", catalog sheet, Delta Controls, 2012.
EnteliWEB "Software: Enterprise Energy Management", catalog sheet, Delta Controls., 2010.
"Intelligent Building Management Systems in Miami," Advanced Control Corp., Mar. 7, 2013.
"The Ohio State University," BACnet International Journal, vol. 5, p. 4, Jan. 2013.
Bobker et al., "Operational Effectiveness in Use of BAS," Proceedings of the 13th International Conference for Enhanced Building Operations, Oct. 8, 2013.
Castelo, "A 3D Interactive Environment for Automated Building Control," Elsevier, Nov. 8, 2012.
"Creston Special Report: How Intelligent building management solutions are reducing operational costs," Creston, 2012.
"Building Automation Software Solutions," Iconics, 2013.
Lacey, "The Top 10 Software Vendors Connecting Smart Buildings to the Smart Grid," http://www.greentechmedia.com/articles/read/the-top-10-companies-in-enterprise-smart-grid, Jul. 18, 2013.
"NiagraAX Product Model Overview," Tridium, Inc., 2005.
"An Overview of NiagraAX: A comprehensive software platform designed to create smart device applications," Tridium, Inc., 2005.
"Phoenix Controls Portal," Phoenix Controls, Inc., 2013.
Quirk, "A Brief History of BIM," Arch Daily, Dec. 7, 2012.
Samad et al., "Leveraging the Web: A Universal Framework for Building Automation," Proceedings of the 2007 American Control Conference, Jul. 11, 2007.
Sinha et al., "9 Key attributes of energy dashboards and analytics tools," Aug. 28, 2013, https://www.greenbiz.com/blog/2013/08/28/9-key-attributes-energy-dashboards-and=analytics-tools.
Sinopoli, "Dashboards For Buildings," http://www/automatedbuildings.com/news/dec10/articles/sinopoli/101119034404sinopoli.html, Dec. 2010.
Sinopoli, "Modeling Building Automation and Control Systems," http://www.automatedbuildings.com/news/jun13/articles/sinopoli/130521122303sinopoli.html, Jun. 2013.
Zito, "What is Tridium Part 1," http://blog.buildingautomationmonthly.com/what-is-tridium/, May 12, 2013.
Zito, "What is Tridium Part 2," http://blog.buildingautomationmonthly.com/tridium-part-2/, Sep. 10, 2013.
International Search Report and Written Opinion dated Jul. 17, 2018 for International PCT Application No. PCT/US2018/025189 (12 pages).
"Data analytics and smart buildings increase comfort and energy efficiency", https://www.microsoft.com/itshowcase/Article/Content/845/Data-analytics-and-smart-buildings-increase-comfort-and-energy-efficiency, Dec. 19, 2016, 8 pages.
Donnelly, "Building Energy Management: Using Data as a Tool", http://www.buildingefficiencyinitiative.org/sites/default/files/legacy/InstituteBE/media/Library/Resources/Existing-Building-Retrofits/Using-Building-Data-as-a-Tool.pdf, Oct. 2012, 9 pages.
"ASHRAE Dashboard Research Project," 29 pages, Aug. 28, 2008.
Honeywell, "Energy Manager User Guide," Release 3.2, 180 pages, 2008.
"Fuzzy Logic Toolbox 2.1, Design and Stimulate Fuzzy Logic Systems," The MathWorks, 2 pages, May 2004.
"Junk Charts, Recycling Chartjunk as junk art," 3 pages, Oct. 2, 2006.
"Model Predictive Control Toolbox 2, Develop Internal Model-Based Controllers for Constrained Multivariable Processes," The MathWorks, 4 pages, Mar. 2005.
Honeywell, "Product Guide 2004," XP-002472407, 127 pages, 2004.
"Statistics Toolbox, for Use with Matlab," User's Guide Version2, The MathWorks, 408 pages, Jan. 1999.
"Vykon Energy Suite Student Guide," Tridium Inc., 307 pages, Mar. 3, 2006.
"Web Based Energy Information Systems for Energy Management and Demand Response in Commercial Buildings," California Energy Commission, 80 pages, Oct. 2003.
Andover Controls, Network News, vol. 2, No. 2, 8 pages, 1997.
Andover Controls World, 4 pages, Spring 1997.
Bell et al., "Early Event Detection-Results from A Prototype Implementation," AICHE Spring National Meeting, 15 pages, Apr. 2005.
Cadgraphics, "The CADGRAPHICS User's Guide," 198 pages, 2003.
Carrier Comfort Network CCN Web, "Web Browser User Interface to the Carrier Comfort Network," 2 pages, 2002.
Carrier Comfort Network CCN Web, Overview and Configuration Manual, 134 pages, Apr. 2006.
Carrier Comfort Network CCN Web, Product Data, 2 pages, Apr. 2006.
Carrier, "i-Vu Powerful and Intuitive Front End for Building Control," 2 pages, Aug. 2005.
Carrier, "i-Vu Web-Based Integrated Control System," 3 pages, 2005.
Carrier, Demo Screen Shots, 15 pages, prior to Aug. 27, 2007.
Carrier, i-Vu CCN 4.0, Owner's Guide, 20 pages, Jul. 2007.
Carrier, i-Vu CCN, 7 pages, 2007.
Chan, "Rank Revealing QR Factorizations," Linear Algebra and It's Applications, vol. 88-89, p. 67-82, Apr. 1987.
Circon, "i-Browse Web-Based Monitoring and Control for Facility Management," 2 pages, prior to Aug. 27, 2007.
Australian Application 2009904740, Published copy, 28 pages, Application Filed on Sep. 29, 2009.
Echelon, "Energy Control Solutions with the i.Lon SmartServer," 4 pages, 2007.
Echelon, "i.Lon 100e3 Internet Server Models 72101R-300, 72101R-308, 72102R-300, 72103-R300 . . . " 5 pages, copyright 2002-2007.
Echelon, "i.Lon 100e3 Internet Server New Features," 15 pages, Sep. 2006.
Echelon, "i.Lon SmartServer," 5 pages, 2007.
Honeywell News Release, "Honeywell's New Sysnet Facilities Integration System for Boiler Plant and Combustion Safety Processes," 4 pages, Dec. 15, 1995.
Honeywell, "Excel Building Supervisor-Integrated R7044 and FS90 Ver. 2.0," Operator Manual, 70 pages, Apr. 1995.
Honeywell Home and Building Control Bulletin, "Introduction of the S7350A Honeywell WebPAD Information Appliance," 2 pages, Aug. 29, 2000; Picture of WebPad Device with touch screen, 1 Page; and screen shots of WebPad Device, 4 pages.
Honeywell, Excel 15B W7760B Building Manager Release 2.02.00, Installation Instructions, 28 pages, Dec. 2004.
Honeywell, The RapidZone Solution, Excel 5000 Open System, Application Guide, 52 pages, Jan. 2004.
"Remote Building Monitoring and Operations Home Page," 5 pages, prior to Aug. 27, 2007.
"Carrier: i-Vu CCN," 1 page, printed Mar. 11, 2008.

(56) References Cited

OTHER PUBLICATIONS

Carrier: 33CSCCNWEB-01 CCN Web Internet Connection to the Carrier Comfort Network, 1 page, printed Mar. 11, 2008.
"Products," 5 pages, printed Jul. 3, 2007. http://www.docs.hvacpartners.com/idc/groups/public/documents/techlit/gs-controls-ivuccn.rtf.
Lightstat Incorporated, "Internet Programmable Communicating Thermostats," 1 page, printed Mar. 13, 2007. http://www.lightstat.com/products/istat.asp.
Sharp, "Actius RD3D Desktop Replacement Notebook with Industry-Breakthrough 3D Screen," 1 page, printed Jun. 16, 2005. http://www.sharpsystems.com/products/pc_notebooks/actius/rd/3d/.
"Lights On A Wireless Lighting Control System," 11 pages, printed Mar. 22, 2007 http://www2.sims.berkeley.edu/courses/is213/s06/projects/lightson;final.html.
I.Lon 100e3 Internet Server, 1 page, prior to Aug. 27, 2007.
I.Lon, SmartServer, 2 pages, prior to Aug. 27, 2007.
I-stat, Demo Screen Shots, 9 pages, printed Mar. 13, 2007.
I-stat, The Internet Programmable Thermostat, 2 pages, prior to Aug. 27, 2007.
Ball, "Green Goal of 'Carbon Neutrality' Hits Limit," TheWall Street Journal, 7 pages, Dec. 30, 2008.
Network Integration Engine (NIE), Johnson Controls, 3 pages, Nov. 9, 2007.
Network Integration Engine (NIE), Product Bulletin, Johnson Controls, pp. 1-11, Jan. 30, 2008.
Kourti, "Process Analysis and Abnormal Situation Detection: From Theory to Practice," IEEE Control Systems Magazine, p. 10-25, Oct. 2002.
Mathew, "Action-Oriented Benchmarking, Using CEUS Date to Identify and Prioritize Efficiency Opportunities in California Commercial Buildings," 26 pages, Jun. 2007.
Morrison et al., "The Early Event Detection Toolkit," Honeywell Process Solutions, 14 pages, Jan. 2006.
Narang, "WEBARC: Control and Monitoring of Building Systems Over the Web," 53 pages, May 1999.
Olken et al., "Object Lessons Learned from a Distributed System for Remote Building Monitoring and Operation," ACM SIGPLAN Notices, vol. 33, No. 10, pp. 284-295, Oct. 1998.
Proliphix, Inc., "Proliphix IP Devices: HTTP API," 28 pages, Jan. 23, 2006.
Proliphix, Inc., "Remote Management User Guide," 12 pages, prior to Aug. 27, 2007.
Rogan et al., "Smart and Final Food Stores: A Case Study in Web Based Energy Information and Collection," Web Based Energy Information and Control Systems: Case Studies and Application, Chapter 6, p. 59-64, 2005.
Sharp, "Actius AL3DU 3D LC Display High Performance 3D Visualization," 2 pages, prior to Mar. 17, 2006.
So et al., "Building Automation on the Information Superhighway," ASHRAE Transactions, vol. 104, Part 2, pp. 176-191, 1998.
So et al., "Building Automation Systems on the Internet," Facilities vol. 15, No. 5/6, pp. 125-133, May/Jun. 1997.
Talon, "Raptor Controller," 6 pages, Oct. 2003.
Talon, "Workstation Software," 4 pages, Nov. 2002.
Trane, "System Programming, Tracer Summit Version 14, BMTW-SVP01D-EN," 623 pages, 2002.
Lucid Design Group, Inc., "Building Dashboard," 2 pages, Printed May 30, 2013.
"America's Largest Managed Security Services Provider Launches Comprehensive, Integrated Covid-19 Safety Program for Office Buildings and Suites," KastleSafeSpaces, 5 pages, May 11, 2020.
"Biometric Door Reader With Body Temperature Detection," Kintronics, 9 pages, accessed May 21, 2020.
"Body Surface Temperature Screening with Alarm Function TVS-200IS/TVS-500IS," Nippon Avionics Co., 3 pages, accessed May 21, 2020.
"BriefCam announces video analytics innovation for contact tracing, physical distancing, occupancy management and face mask detection," BriefCam LTD, 11 pages, Jun. 5, 2020.
"Thermal Imaging SmartPhone Can Be used For Temperature Screening of People," CAT, 3 pages, accessed Jul. 13, 2020.
"Contact Tracing Now Available on Identiv's Hirsch Velocity Access Control Platform," IDENTIV, 5 pages, May 21, 2020.
Silva et al., "Cough localization for the detection of respiratory diseases in pig houses," ScienceDirect, 7 pages, May 28, 2008.
Oey et al., "Evaluation of Isolation Compliance Using Real Time Video In Critical Care," North Shore University Hospital, 1 page, Oct. 9, 2015.
"Facial Attendace System With Temperature Screening Now In India," IANS, 5 pages, Mar. 19, 2020.
"Plan to Re-Open," EHIGH, 16 pages, accessed Jun. 13, 2020.
"How Smarter AI-Powered Cameras Can Mitigate the Spread of Wuhan Novel," AnyConnect, 22 pages, 2020.
"How to fight COVID-19 with machine learning," DataRevenue, 20 pages, accessed May 25, 2020.
Honeywell, "INNCONTROL 5," 2 pages, Aug. 8, 2018.
"IP Door Access Control," KINTRONICS, 21 pages, 2014.
"Kogniz AI Health Response Platform," KOGNIZ, 9 pages, accessed May 21, 2020.
"Machine Learning Could Check If You're Social Distancing Properly at Work," MIT Technology Review, 7 pages, Apr. 17, 2020.
Punn et al., "Monitoring COVID-19 social distancing with person detection and tracking via fine-tuned YOLO v3 and Deepsort techniques," 10 pages, May 6, 2020.
Burt, "NEC launches dual face biometric and fever detection system for access control," BIOMETRIC Update, 4 pages, May 8, 2020.
"Remote temperature monitoring," AXIS Communication, 10 pages, 2014.
"FebriEye-AI Based Thermal Temperature Screening System," vehant, 1 page, 2020.
"See The World In A New Way Hikvision Thermal Cameras," HIKVISION, 12 pages, 2017.
Allain, "Trying out the iPhone Infrared Camera: The FLIR One," WIRED, 15 pages, 2014.
Dasgupta, "Your voice may be able to tell you if you have Covid," Hindustan Times, 4 pages, Apr. 16, 2020.
Ganguty, "Gurugram-based startup Staqu has modified AI-powered JARVIS to battle coronavirus," YOURSTORY, 7 pages, Mar. 31, 2020.
Trane, "Creating Input/Output Objects," 196 pages, retrieved Jul. 10, 2020.
Trane, "Using the Graphing Control Editor," 181 pages, retrieved Jul. 10, 2020.
Extended European Search Report, EP Application No. 22161097.5, European Patent Office, dated Aug. 2, 2022 (8 pages).

| Pillar | Measure | Points | Reading | Score | Pillar Score | Pillar Rating |
|---|---|---|---|---|---|---|
| Air Quality | Monitor Relative Humidity | 9 | yes | 9 | | |
| | Current RH between 40%-60% | 9 | 50% | 9 | | |
| | Monitor Particulate Matter | 5 | yes | 5 | | |
| | Current PM25 below 10 ug/m3 | 5 | 5 | 5 | | |
| | Monitor TVOC | 1 | yes | 1 | | |
| | Current TVOC less than .3 mg/m3 | 1 | 0.1 | 1 | | |
| | Monitor Temperature | 5 | yes | 5 | | |
| | Current temperature between 20-25C | 5 | 22 | 5 | 40/40 | 5 stars |
| Ventilation | Monitor CO2 Levels | 5 | yes | 5 | | |
| | Current CO2 less than 500ppm | 5 | 400 | 5 | | |
| | Monitor Ventilation Rate | 7 | No | 0 | | |
| | Current Ventilation rate of 2 Air Changes per Hour | 7 | 1 | 0 | 10/24 | 2 stars |
| Safety & Security | Monitor Occupancy Levels | 7 | yes | 7 | | |
| | Current occupancy levels | 7 | 75% | 7 | | |
| | Monitor Body Temperature | 5 | yes | 5 | | |
| | Current Body Temperature Incident count | 5 | 0 | 5 | | |
| | Monitor Mask Compliance | 5 | yes | 5 | | |
| | Current Mask Compliance Alert Count | 5 | 1 | 5 | | |
| | Monitor Crowding Incidents | 5 | No | 0 | | |
| | Current Crowd Alert Count | 5 | 0 | 5 | 39/44 | 5 stars |
| Space Treatment | Install EAC+UV | 5 | yes | 5 | | |
| | Install Surface UVC | 5 | No | 0 | | |
| | Install Needle Point Ionization | 7 | No | 0 | 5/17 | 1 star |
| | Points Total | 125 | Points | 94 | | |
| | | | Score | 94/125 | | |
| | | | Rating | 4 stars | | |

FIG. 9

Monitor

How do you monitor?
- 192a — ☐ Integrated Overview Dashboard
- 192b — ☑ Locally (On the controller or hand held)
- 192c — ☐ We don't monitor How do you take action?
- 194a — ☐ Fully automated SOP's and actions
- 194b — ☐ Semi automated SOP's and actions
- 194c — ☑ Manual intervention for e.g. change set points, manual ventilation, dispatch security 196 — [Submit]

FIG. 12

METHODS AND SYSTEMS FOR IMPROVING BUILDING PERFORMANCE

TECHNICAL FIELD

The present disclosure pertains to method and systems for improving performance of a building.

BACKGROUND

Building performance relates to how well a building meets certain building performance objectives of a building. These objectives can include, for example, building sustainability objectives, building productivity objectives and healthy building objectives. Building sustainability may related to how well the building meets certain building sustainability criteria such as energy efficiency, water usage efficiency, $CO_2$ emissions, indoor environmental quality, and efficient operation and maintenance practices of the building. Building productivity may relate to how well the building creates a productive environment for the building occupants. Building productivity can be influenced by, for example, temperature, humidity, ventilation, CO levels, air flow, lighting, noise and/or other factors in the building. Healthy building objectives may relate to how well the building creates a healthy environment for the building occupants. Creating a healthy environment for the building occupants can be influenced by temperature, humidity, ventilation rates, filtering, UVC sanitization, cleaning schedules, contactless security checkpoints, occupant behavior such as monitoring and maintaining social distancing, mask compliance, identifying coughing, sneezing, and elevated skin temperature, etc. It is noted that building sustainability, building productivity and healthy building objectives can be competing against one another. For example, elevating the temperature and humidity in a building may increase occupant productivity, but may reduce energy efficiency. In another example, reducing outside air ventilation may increase energy efficiency, but may reduce occupant productivity and occupant health.

In many cases, the facility manager does not or is not able to track the overall performance of their building. In some cases, a particular building may not have the equipment necessary for monitoring and/or improving one or more building performance objectives, and/or the facilities manager may not have the expertise to identify and manage the often complex interrelated and competing nature of various building performance factors. A need remains for ways to determine a building's current performance as well as provide recommendations on how to improve the building's performance.

SUMMARY

The present disclosure pertains to method and systems for improving performance of a building. The present disclosure can be used to determine a building's current performance, including determining a current building sustainability performance, current building productivity performance, a healthy building performance and/or any other performance objective and/or criteria, as well as provide recommendations on how to improve the building's current performance. While healthy building performance is used as a detailed example below, it is contemplated that building sustainability performance, building productivity performance and/or other building performance objectives and/or criteria may be used in a similar manner. It is also contemplated that the recommendations on how to improve a building's current performance may take into account the often complex interrelated and competing nature of various building performance factors, sometimes with input from a facility manager as to the particular needs of the particular building. This may be accomplished by, for example, computing and presenting a building sustainability score, a building productivity score and a healthy building score. In some cases, the facility manager may indicate that building sustainability (e.g. energy usage) should be prioritized over building productivity and healthy building objectives, and thus may be willing to accept a lower building productivity score and a lower healthy building score to achieve a high building sustainability score. In other cases, the facility manager may indicate that healthy building objectives should be prioritized over building sustainability and building productivity during a pandemic, and thus may be willing to accept a lower building sustainability score and a lower building productivity score to achieve a high healthy building score. In some cases, this tradeoff may be time dependent. For example, the facility manager may priorities building sustainability (e.g. energy usage) during unoccupied time periods and building productivity and/or healthy building objectives during occupied time periods. These are just examples.

In one example, a kit may be used for ascertaining a current healthy building performance of a building and determining recommendations for improving the healthy building performance of the building. The healthy building performance may be based upon a plurality of healthy building criteria each defining a desired range for a corresponding healthy building parameter. The illustrative kit includes a plurality of hand-held sensors that are each configured to provide a current value of one or more of the healthy building parameters. The kit also includes a portable device that includes a user interface, a memory and a processor operably coupled to the user interface and to the memory. The processor is configured to generate one or more screens displayable on the user interface that solicit a user to enter information pertaining to healthy building equipment that is currently in use within the building and to generate one or more screens displayable on the user interface instructing the user to employ one or more of the plurality of hand-held sensors to measure a current value of one or more of the healthy building parameters. The portable device is configured to capture and store in the memory the measured current values of the one or more of the healthy building parameters that were measured using the one or more of the plurality of hand-held sensors. The portable device is configured to determine a healthy building score and one or more recommendations for improving the healthy building score of the building based at least in part on the entered information pertaining to currently installed healthy building equipment, the captured measured current values for each of the one or more of the healthy building parameters that were measured using the one or more of the plurality of hand-held sensors, and the plurality of healthy building criteria. The portable device is configured to output the healthy building score and the one or more recommendations for improving the healthy building score of the building via the user interface.

In another example, a system may be used for ascertaining a current healthy building performance of a building and making recommendations for improving the healthy building performance of the building. The healthy building performance may be based upon a plurality of healthy building criteria each defining a desired range for a corresponding healthy building parameter, the building including a plurality of zones. The illustrative system includes a plurality of hand-held sensors that are each configured to provide a measure of a current value for one of the plurality of healthy building criteria. The system also includes a portable device that includes a user interface, a memory and a processor operably coupled to the user interface and to the memory. The processor is configured to generate one or more screens displayable on the user interface in order to solicit a user to enter information pertaining to healthy building equipment that is currently in use within the building and to generate one or more screens displayable on the user interface instructing the user to employ one or more of the plurality of hand-held sensors to measure a current value of one or more of the healthy building parameters within each zone of the plurality of zones of the building. The processor is configured to capture and store in the memory the measured current values of the one or more of the healthy building parameters that were measured for each of the plurality of zones using the one or more of the plurality of hand-held sensors. The processor is configured to determine a healthy building score for each of the plurality of zones based at least in part on the entered information pertaining to currently installed healthy building equipment, the captured measured current values for each of the one or more of the healthy building parameters that were measured for the corresponding one of the plurality of zones and the plurality of healthy building criteria. The processor is configured to aggregate the healthy building score for each of the plurality of zones to determine an aggregate healthy building score for the building and to display via the user interface a dashboard that provides the aggregated healthy building score for the building.

Another example is a non-transient, computer-readable storage medium having instructions stored thereon. When the instructions are executed by one or more processors of a portable device, the one or more processors are caused to generate one or more screens displayable on a user interface of the portable device in order to solicit a user to enter information pertaining to building equipment that is currently in use within a building and to generate one or more screens displayable on the user interface instructing the user to employ one or more of a plurality of hand-held sensors to measure a current value for one or more of a plurality of building parameters. The one or more processors are caused to capture and store in a memory of the portable device the measured current values for each of the one or more of the plurality of building parameters that were measured using the one or more of the plurality of hand-held sensors. The one or more processors are caused to determine a building score and one or more recommendations for improving the building score of the building based at least in part on the entered information pertaining to currently installed building equipment, the captured measured current values for each of the one or more of the plurality of building parameters that were measured using the one or more of the plurality of hand-held sensors, and one or more building performance criteria, at least some of which define a desired range for a corresponding one of the plurality of building parameters that were measured using the one or more of the plurality of hand-held sensors. The one or more processors are caused to output the building score and the one or more recommendations for improving the building score of the building via the user interface.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIG. 9 is a table showing how a score may be calculated for various healthy building objectives; and FIG. 10 through 14 are screen shots displayable using a portable device forming a part of the kit of FIG. 1 and the system of FIG. 6.

Figure 1:
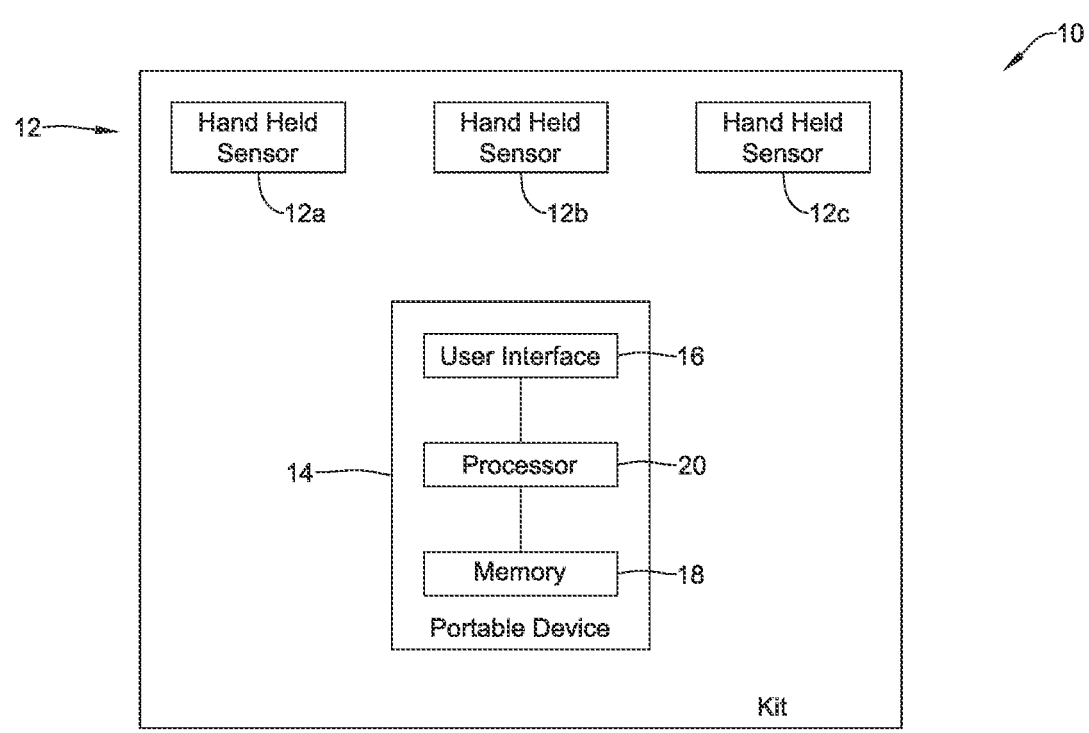
FIG. 1 is a schematic block diagram of an illustrative kit.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Building performance relates to how well a building meets certain building performance objectives of a building. These objectives can include, for example, building sustainability objectives, building productivity objectives and healthy building objectives. Building sustainability may related to how well the building meets certain building sustainability criteria such as energy efficiency, water usage efficiency, CO2 emissions, indoor environmental quality, and efficient operation and maintenance practices of the building. Building productivity may relate to how well the building creates a productive environment for the building occupants. Building productivity can be influenced by, for example, temperature, humidity, ventilation, CO levels, air flow, lighting, noise and/or other factors in the building. Healthy building objectives may relate to how well the building creates a healthy environment for the building occupants. Creating a healthy environment for the building occupants can be influenced by temperature, humidity, ventilation rates, filtering, UVC sanitization, cleaning schedules, contactless security checkpoints, occupant behavior such as monitoring and maintaining social distancing, mask compliance, identifying coughing, sneezing, and elevated skin temperature, etc. It is noted that building sustainability, building productivity and healthy building objectives can be competing against one another. For example, elevating the temperature and humidity in a building may increase occupant productivity, but may reduce energy efficiency. In another example, reducing outside air ventilation may increase energy efficiency, but may reduce occupant productivity and occupant health.

The present disclosure can be used to determine a building's current performance, including determining a current building sustainability performance, current building productivity performance, a healthy building performance and/or any other performance objective and/or criteria, as well as provide recommendations on how to improve the building's current performance. The following description uses healthy building performance as a detailed example. However, it should be understood that building sustainability performance, building productivity performance and/or other building performance objectives and/or criteria may be used in a similar manner. It is also contemplated that the recommendations on how to improve a building's current performance may take into account the often complex interrelated and competing nature of various building performance factors, sometimes with input from a facility manager as to the particular needs of the particular building. This may be accomplished by, for example, computing and presenting a building sustainability score, a building productivity score and a healthy building score. In some cases, the facility manager may indicate that building sustainability (e.g. energy usage) should be prioritized over building productivity and healthy building objectives, and thus may be willing to accept a lower building productivity score and a lower healthy building score to achieve a high building sustainability score. In other cases, the facility manager may indicate that healthy building objectives should be prioritized over building sustainability and building productivity during a pandemic, and thus may be willing to accept a lower building sustainability score and a lower building productivity score to achieve a high healthy building score. In some cases, this tradeoff may be time dependent. For example, the facility manager may priorities building sustainability (e.g. energy usage) during unoccupied time periods and building productivity and/or healthy building objectives during occupied time periods. These are just examples.

Facilities often include building automation systems (e.g., heating, ventilation, and air conditioning (HVAC) systems, surveillance systems, security systems, energy management systems, etc.). Various organizations worldwide (e.g., government organizations, educational organizations, etc.) have provided guidelines on how to operate building automation system to reduce risk of disease transmissions within facilities. Similarly, various organizations worldwide have provided guidelines on how occupants of a facility and monitoring occupancy can reduced risk of disease transmission. Other guidelines relating to facilities and transmission of infectious disease are contemplated and may be adapted and used, depending on the facility. In some cases, a facility may meet one or more healthy building guidelines, but may be lacking with respect to other healthy building guidelines. Facility managers may, for example, wish to find out how to improve their facility's performance with respect to the healthy building guidelines. In some cases, facility managers may, for example, wish to find out how to improve their facility's performance with respect to the building sustainability performance and/or building productivity performance. In some cases, a kit may be used to help the facility manager learn their building's current building performance as well as learning ways that they can improve their building's building performance. This may include adding additional equipment, for example, or changing how they are utilizing building equipment they already have.

FIG. 1 is a schematic block diagram of an illustrative kit 10. The kit 10 is configured for ascertaining a current healthy building performance of a building and determining recommendations for improving the healthy building performance of the building, the healthy building performance based upon a plurality of healthy building criteria each defining a desired range for a corresponding healthy building parameter. The illustrative kit 10 includes a number of hand-held sensors 12, individually labeled as 12a, 12b, 12c. Each hand-held sensor 12 may be configured to detect a single healthy building parameter. In some cases, one of the hand-held sensors 12 may be configured to detect two, three or more distinct healthy building parameters. Healthy building parameters include but are not limited to indoor air temperature, outdoor air temperature, indoor relative humidity, outdoor relative humidity, particulate matter concentrations, carbon dioxide concentration (can be used as a rough indicator of relative occupancy, since humans exhale carbon dioxide), and volatile organic compound concentration. Each of the hand-held sensors 12 may, for example, represent one or more of a humidity sensor, a temperature sensor, a particulate matter sensor, a carbon dioxide sensor or a volatile organic compound sensor. These are just examples, and other types of sensors are also contemplated. In some cases, the hand-held sensors 12 are distinct from any sensors a particular building may already have.

For example, a Heating, Ventilating and Air Conditioning (HVAC) system within a building may employ a number of temperature sensors and/or humidity sensors that are disposed about the building and that are configured to provide periodic or even continuous signals reporting measured temperatures and/or measured relative humidity values throughout the building. The hand-held sensors 12 may be distinct from these sensors, and may be configured to be able to be used by a person walking around in a building and using the hand-held sensors 12 to take readings of any of a variety of different healthy building parameters throughout the building. The hand-held sensors 12 may be considered as providing a check against the accuracy of any sensors already present and operational within a building and thus may be useful in detecting installed sensors that are not working correctly, or are in need of calibration. The hand-held sensors 12 can be used to measure a variety of healthy building parameters at various points around a building, even in cases where the building itself does not already have sensors that can measure the corresponding healthy building parameters in question.

In the example shown, the hand-held sensors 12 are configured to work in combination with a portable device 14. In some instances, the portable device 14 may be a tablet or a smart phone. In some cases, the portable device 14 may be a purpose-built device. The portable device 14 includes a user interface 16, a memory 18 and a processor 20 that is operably coupled to the user interface 16 and to the memory 18. The processor 20 may be configured to display any of a variety of different screens on the user interface 16. These screens may provide instructions to a user to enter a variety of different information, for example. The user may be instructed to enter healthy building parameter values detected by one or more of the hand-held sensors 12. In some cases, the user may be instructed to facilitate wireless communication between the hand-held sensors 12 and the portable device 14 so that the portable device 14 can capture the healthy building parameter values obtained by the hand-held sensors 12 directly from the hand-held sensors 12. The user may be instructed to answer a variety of questions pertaining to the equipment currently in operation within the building, for example. The screens may be used to output a current healthy building score in combination with one or more recommendations on how to improve the healthy building score for that building.

The processor 20 may be configured to carry out a variety of different steps. FIGS. 2 through 5 are flow diagrams providing a representation of what the processor 20 is configured to do in order to assist a user of the kit 10 in determining a current healthy building score for a particular building as well as one or more recommendations on how to improve the healthy building score for the particular building.

Figure 2:
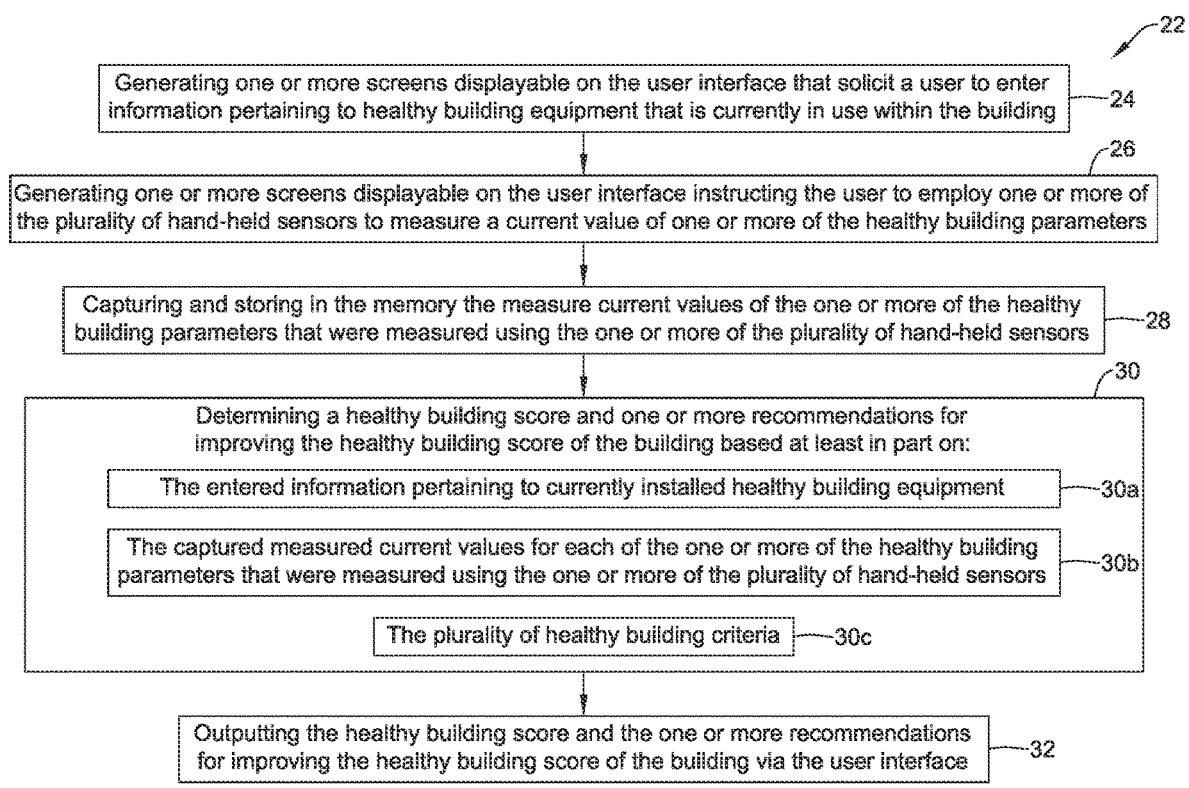
FIGS. 2 through 5 are flow diagrams showing illustrative methods that may be carried out using the illustrative kit of FIG. 1.

FIG. 2 is a flow diagram showing an illustrative set of steps 22 that provide an example of some of the functionality the processor 20 is configured to accomplish. In some instances, the processor 20 is configured to generate one or more screens displayable on the user interface 16 that solicit a user to enter information pertaining to healthy building equipment that is currently in use within the building, as indicated at block 24. The processor 20 may be configured to generate one or more screens displayable on the user interface 16 instructing the user to employ one or more of the plurality of hand-held sensors 12 to measure a current value of one or more of the healthy building parameters, as indicated at block 26. The processor 20 may be configured to capture and store in the memory the measured current values of the one or more of the healthy building parameters that were measured using the one or more of the plurality of hand-held sensors 12, as indicated at block 28.

In some cases, and as indicated at block 30, the processor 20 may be configured to determine a healthy building score and one or more recommendations for improving the healthy building score of the building. This may be based at least in part on the entered information pertaining to currently installed healthy building equipment, as indicated at block 30a, the captured measured current values for each of the one or more of the healthy building parameters that were measured using the one or more of the plurality of hand-held sensors 12, as indicated at block 30b, and the plurality of healthy building criteria, as indicated at block 30c. The information pertaining to healthy building equipment that is currently in use within the building may include whether the building currently has one or more of a humidity sensor, a humidifier and/or a dehumidifier. The information pertaining to healthy building equipment that is currently in use within the building may include whether the building currently has one or more of an Indoor Air Quality (IAQ) sensor, fresh air ventilation capability, and air filtration capability. The processor 20 may be configured to output the healthy building score and the one or more recommendations for improving the healthy building score of the building via the user interface, as indicated at block 32.

In some cases, the processor 20 may be configured to perform the capturing step (block 28) and the determining step (block 30) for each zone of a plurality of zones within a building. The processor 20 may be configured to determine a healthy building score that represents a compilation of a healthy building score for each zone of the plurality of zones. In some cases, the processor 20 may be configured to determine the one or more recommendations for improving the healthy building score by aggregating recommendations for improving the healthy building score for each zone of the plurality of zones.

Figure 3:
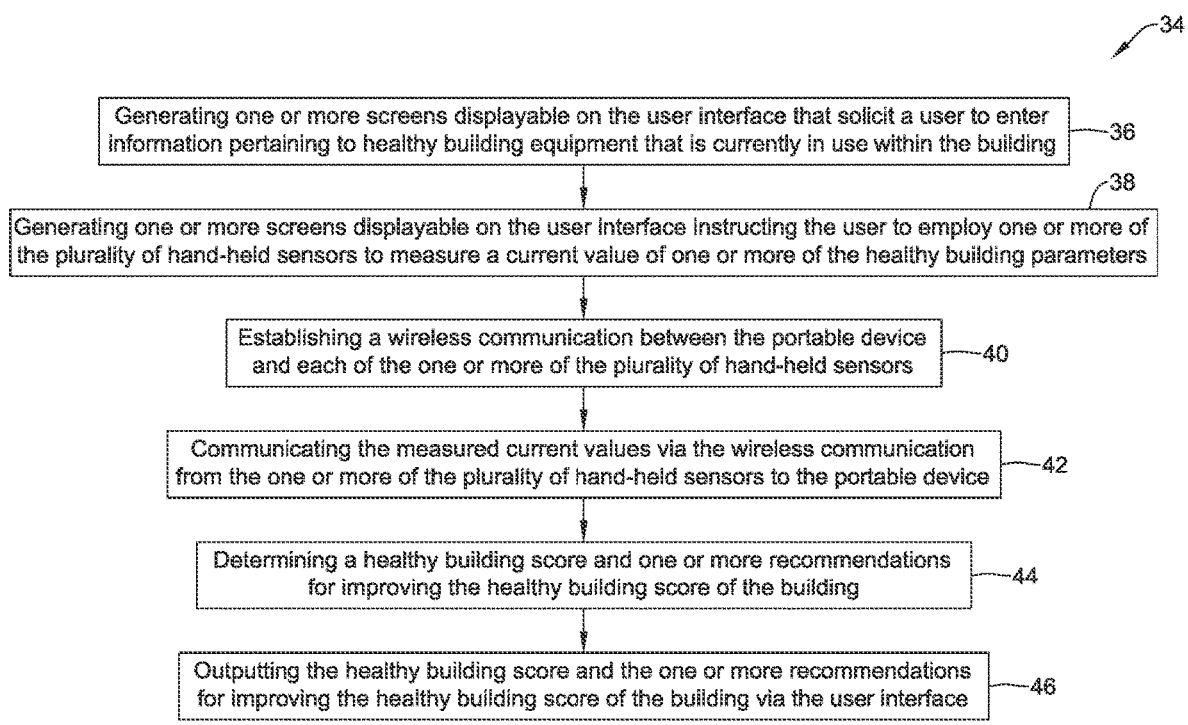

FIG. 3 is a flow diagram showing an illustrative set of steps 34 that provide an example of some of the functionality the processor 20 is configured to accomplish. In some instances, the processor 20 is configured to generate one or more screens displayable on the user interface 16 that solicit a user to enter information pertaining to healthy building equipment that is currently in use within the building, as indicated at block 36. The processor 20 may be configured to generate one or more screens displayable on the user interface 16 instructing the user to employ one or more of the plurality of hand-held sensors 12 to measure a current value of one or more of the healthy building parameters, as indicated at block 38. The processor 20 may be configured to establish a wireless communication between the portable device 14 and each of the one or more hand-held sensors 12, as indicated at block 40. The measured current values may be communicated via the wireless communication from each of the one or more hand-held sensors 12 to the portable device 14, as indicated at block 42.

In some cases, and as indicated at block 44, the processor 20 may be configured to determine a healthy building score and one or more recommendations for improving the healthy building score of the building. This may be based at least in part on the entered information pertaining to currently installed healthy building equipment, the captured measured current values for each of the one or more of the healthy building parameters that were measured using the one or more of the plurality of hand-held sensors, and the plurality of healthy building criteria. The information pertaining to healthy building equipment that is currently in use within the building may include whether the building currently has one or more of a humidity sensor, a humidifier and/or a dehumidifier. The information pertaining to healthy building equipment that is currently in use within the building may include whether the building currently has one or more of an Indoor Air Quality (IAQ) sensor, fresh air ventilation capability, and air filtration capability. The processor 20 may be configured to output the healthy building score and the one or more recommendations for improving the healthy building score of the building via the user interface 16, as indicated at block 46.

Figure 4:
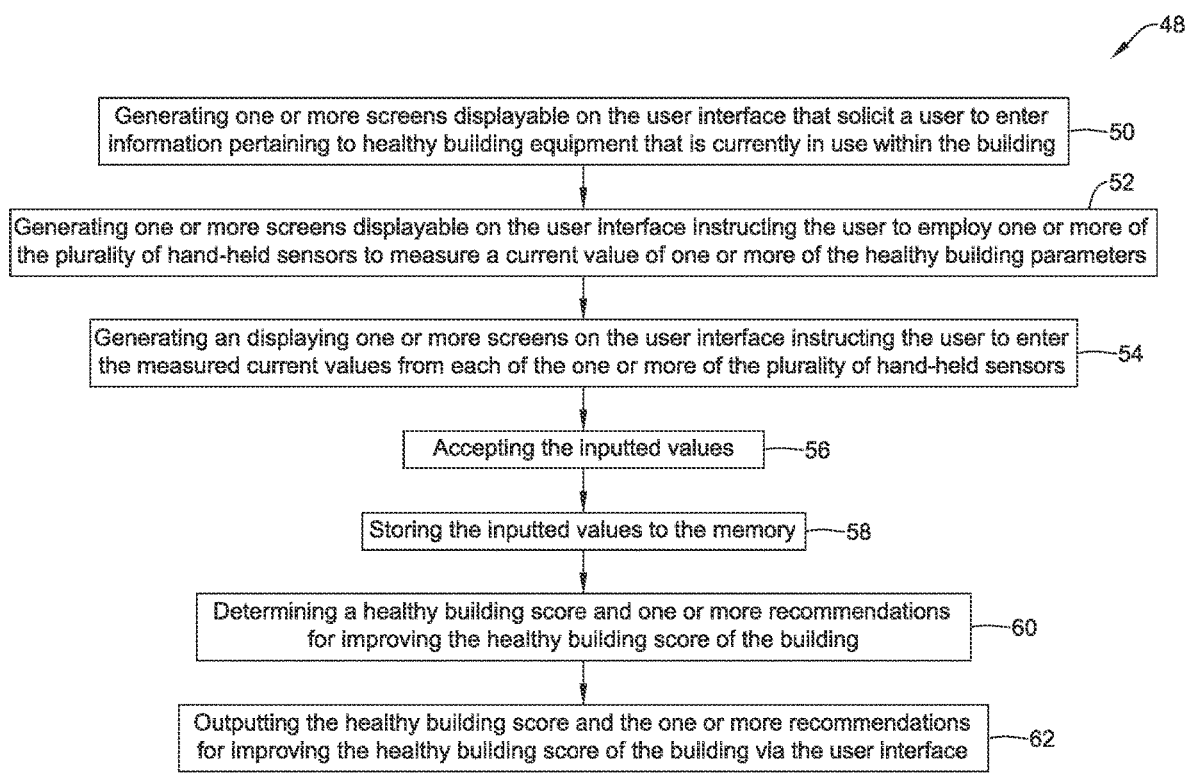

FIG. 4 is a flow diagram showing an illustrative set of steps 48 that provide an example of some of the functionality the processor 20 is configured to accomplish. In some instances, the processor 20 is configured to generate one or more screens displayable on the user interface 16 that solicit a user to enter information pertaining to healthy building equipment that is currently in use within the building, as indicated at block 50. The processor 20 may be configured to generate one or more screens displayable on the user interface 16 instructing the user to employ one or more of the plurality of hand-held sensors 12 to measure a current value of one or more of the healthy building parameters, as indicated at block 52. The processor 20 may be configured to generate and display one or more screens on the user interface 16 instructing the user to enter the measured current values from each of the one or more hand-held sensors 12, as indicated at block 54. The inputted values may be accepted, as indicated at block 56. The processor 20 may be configured to store the inputted values to the memory 18, as indicated at block 58.

In some cases, and as indicated at block 60, the processor 20 may be configured to determine a healthy building score and one or more recommendations for improving the healthy building score of the building. This may be based at least in part on the entered information pertaining to currently installed healthy building equipment, the captured measured current values for each of the one or more of the healthy building parameters that were measured using the one or more of the plurality of hand-held sensors, and the plurality of healthy building criteria. The information pertaining to healthy building equipment that is currently in use within the building may include whether the building currently has one or more of a humidity sensor, a humidifier and/or a dehumidifier. The information pertaining to healthy building equipment that is currently in use within the building may include whether the building currently has one or more of an Indoor Air Quality (IAQ) sensor, fresh air ventilation capability, and air filtration capability. The processor 20 may be configured to output the healthy building score and the one or more recommendations for improving the healthy building score of the building via the user interface 16, as indicated at block 62.

Figure 5:
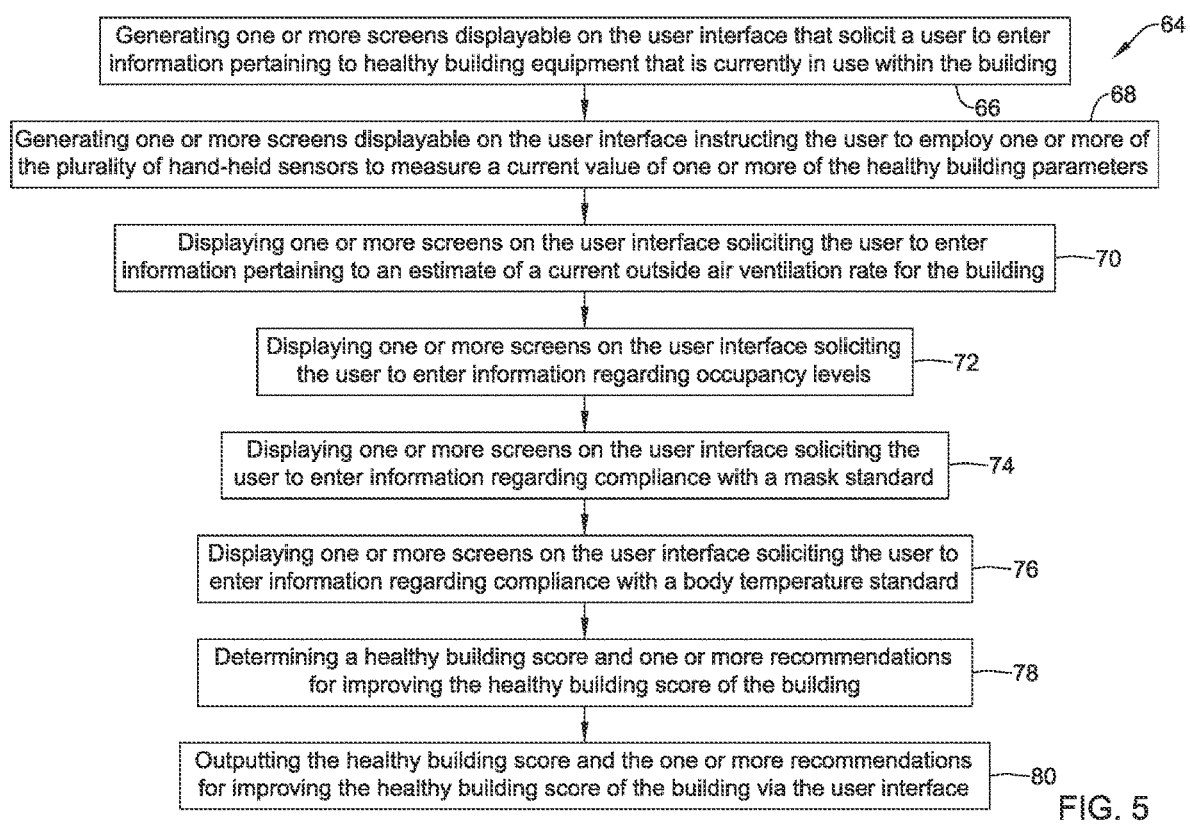

FIG. 5 is a flow diagram showing an illustrative set of steps 64 that provide an example of some of the functionality the processor 20 is configured to accomplish. In some instances, the processor 20 is configured to generate one or more screens displayable on the user interface 16 that solicit a user to enter information pertaining to healthy building equipment that is currently in use within the building, as indicated at block 66. The processor 20 may be configured to generate one or more screens displayable on the user interface 16 instructing the user to employ one or more of the plurality of hand-held sensors 12 to measure a current value of one or more of the healthy building parameters, as indicated at block 68.

The processor 20 may be configured to display one or more screens on the user interface 16 soliciting the user to enter information pertaining to an estimate of a current outside air ventilation rate for the building, as indicated at block 70. The processor 20 may be configured to display one or more screens on the user interface 16 soliciting the user to enter information regarding occupancy levels, as indicated at block 72. The processor 20 may be configured to display one or more screens on the user interface 16 soliciting the user to enter information regarding compliance with a mask standard, as indicated at block 74. The processor 20 may be configured to display one or more screens on the user interface 16 soliciting the user to enter information regarding compliance with a body temperature standard, as indicated at block 76. It will be appreciated that in some cases, there may not be a suitable hand-held sensor 12 that is configured to ascertain an air ventilation rate and/or ascertain occupancy levels and/or ascertain compliance with mask standards and/or ascertain compliance with body temperature standards, for example.

In some cases, and as indicated at block 78, the processor 20 may be configured to determine a healthy building score and one or more recommendations for improving the healthy building score of the building. This may be based at least in part on the entered information pertaining to currently installed healthy building equipment, the captured measured current values for each of the one or more of the healthy building parameters that were measured using the one or more of the plurality of hand-held sensors, and the plurality of healthy building criteria. The information pertaining to healthy building equipment that is currently in use within the building may include whether the building currently has one or more of a humidity sensor, a humidifier and/or a dehumidifier. The information pertaining to healthy building equipment that is currently in use within the building may include whether the building currently has one or more of an Indoor Air Quality (IAQ) sensor, fresh air ventilation capability, and air filtration capability. The processor 20 may be configured to output the healthy building score and the one or more recommendations for improving the healthy building score of the building via the user interface 16, as indicated at block 80.

Figure 6:
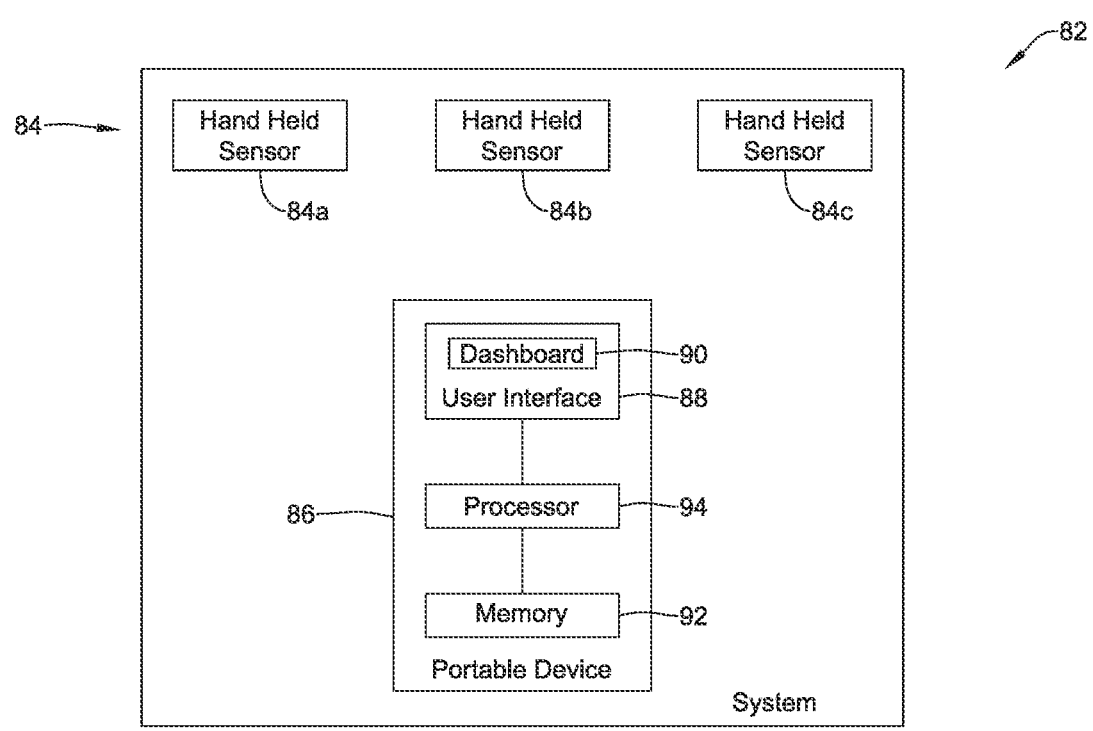
FIG. 6 is a schematic block diagram of an illustrative system.

FIG. 6 is a schematic block diagram of an illustrative system 82. It will be appreciated that the components of the system 82, as will be described, are quite similar to the components of the kit 10 described with respect to FIGS. 1 through 5. Particular features described with respect to the kit 10 may be considered as applying equally to the system 82. Particular features described with respect to the system 82 may be considered as applying equally to the kit 10. The system 82 is configured for ascertaining a current healthy building performance of a building and determining recommendations for improving the healthy building performance of the building, the healthy building performance based upon a plurality of healthy building criteria each defining a desired range for a corresponding healthy building parameter.

The system 82 includes a number of hand-held sensors 84, individually labeled as 84a, 84b, 84c. The hand-held sensors 84 may be considered as being equivalent to the hand-held sensors 12. Each hand-held sensor 84 may be configured to detect a single healthy building parameter. In some cases, one of the hand-held sensors 84 may be configured to detect two, three or more distinct healthy building parameters. Healthy building parameters include but are not limited to indoor air temperature, outdoor air temperature, indoor relative humidity, outdoor relative humidity, particulate matter concentrations, carbon dioxide concentration (can be used as a rough indicator of relative occupancy, since humans exhale carbon dioxide), and volatile organic compound concentration. Each of the hand-held sensors 84 may, for example, represent one or more of a humidity sensor, a temperature sensor, a particulate matter sensor, a carbon dioxide sensor or a volatile organic compound sensor. These are just examples, and other types of sensors are also contemplated. The hand-held sensors 84 are distinct from any sensors a particular building may already have.

For example, a Heating, Ventilating and Air Conditioning (HVAC) system within a building may employ a number of temperature sensors and/or humidity sensors that are disposed about the building and that are configured to provide periodic or even continuous signals reporting measured temperatures and/or measured relative humidity values throughout the building. The hand-held sensors 84 are distinct from these sensors, and are configured to be able to be used by a person walking around in a building and using the hand-held sensors 84 to take readings of any of a variety of different healthy building parameters throughout the building. The hand-held sensors 84 may be considered as providing a check against the accuracy of any sensors already present and operational within a building and thus may be useful in detecting installed sensors that are not working correctly, or are in need of calibration. The hand-held sensors 84 can be used to measure a variety of healthy building parameters at various points around a building, even in cases where the building itself does not already have sensors that can measure the healthy building parameters in question.

The hand-held sensors 84 are configured to work in combination with a portable device 86. The portable device 86 may be considered as being similar to the portable device 14. In some instances, the portable device 86 may be a tablet or a smart phone. In some cases, the portable device 86 may be a purpose-built device. The portable device 86 includes a user interface 88 with a dashboard 90, a memory 92 and a processor 94 that is operably coupled to the user interface 88 and to the memory 92. The processor 94 may be configured to display any of a variety of different screens on the user interface 88. These screens may provide instructions to a user to enter a variety of different information, for example. The user may be instructed to enter healthy building parameter values detected by one or more of the hand-held sensors 84. The user may be instructed to facilitate wireless communication between the hand-held sensors 84 and the portable device 86 so that the portable device 86 can capture the healthy building parameter values obtained by the hand-held sensors 84 directly from the hand-held sensors 84. The user may be instructed to answer a variety of questions pertaining to the equipment currently in operation within the building, for example. The screens may be used to output a current healthy building score in combination with one or more recommendations on how to improve the healthy building score for that building.

Figure 7:
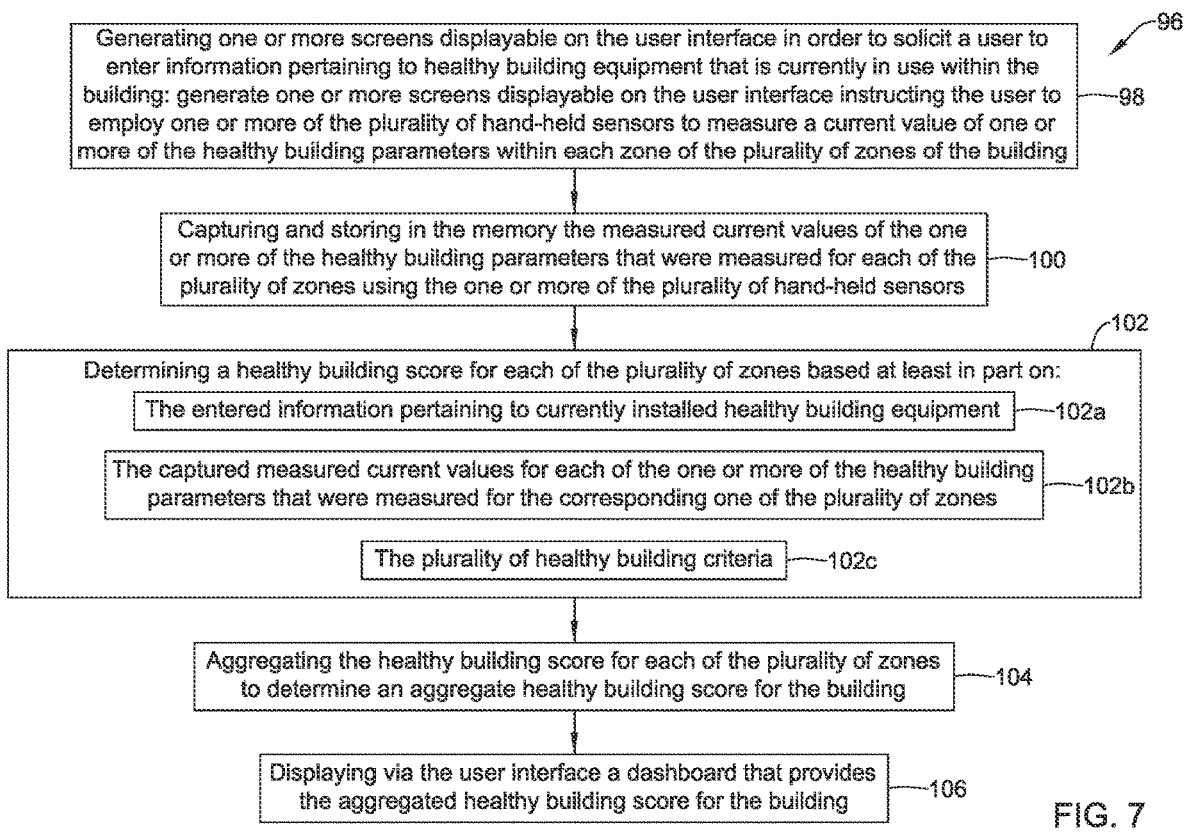
FIG. 7 is a flow diagram showing an illustrative method that may be carried out using the illustrative system of FIG. 6.

The processor 94 may be configured to carry out a variety of different steps. FIG. 7 is a flow diagram providing a representation of what the processor 94 is configured to do in order to assist a user of the system 82 in determining a current healthy building score for a particular building as well as one or more recommendations on how to improve the healthy building score for the particular building. The processor 94 may be configured to generate one or more screens displayable on the user interface 88 in order to solicit a user to enter information pertaining to healthy building equipment that is currently in use within the building, as indicated at block 96. The processor 94 may be configured to generate one or more screens displayable on the user interface 88 instructing the user to employ one or more of the plurality of hand-held sensors 84 to measure a current value of one or more of the healthy building parameters within each zone of the plurality of zones of the building, as indicated at block 98.

The processor 94 may be configured to capture and store in the memory 92 the measured current values of the one or more of the healthy building parameters that were measured for each of the plurality of zones using the one or more of the plurality of hand-held sensors 84, as indicated at block 100. The processor 94 may be configured to determine a healthy building score for each of the plurality of zones, as indicated at block 102. The healthy building score for each of the plurality of zones may be based at least in part on the entered information pertaining to currently installed healthy building equipment, as indicated at block 102a, the captured measured current values for each of the one or more of the healthy building parameters that were measured for the corresponding one of the plurality of zones, as indicated at block 102b, and the plurality of healthy building criteria, as indicated at block 102c.

The processor 94 may be configured to aggregate the healthy building score for each of the plurality of zones to determine an aggregate healthy building score for the building, as indicated at block 104. The processor 94 may be configured to display via the user interface 88 a dashboard (such as the dashboard 90) that provides the aggregated healthy building score for the building. In some cases, the processor 94 may be configured to also display each of the individual healthy building scores for each of the zones. This may aid a user in determining, for example, if the overall healthy building score is skewed by a particular zone that is either substantially underperforming relative to the other zones or is substantially overperforming relative to the other zones.

Figure 8:
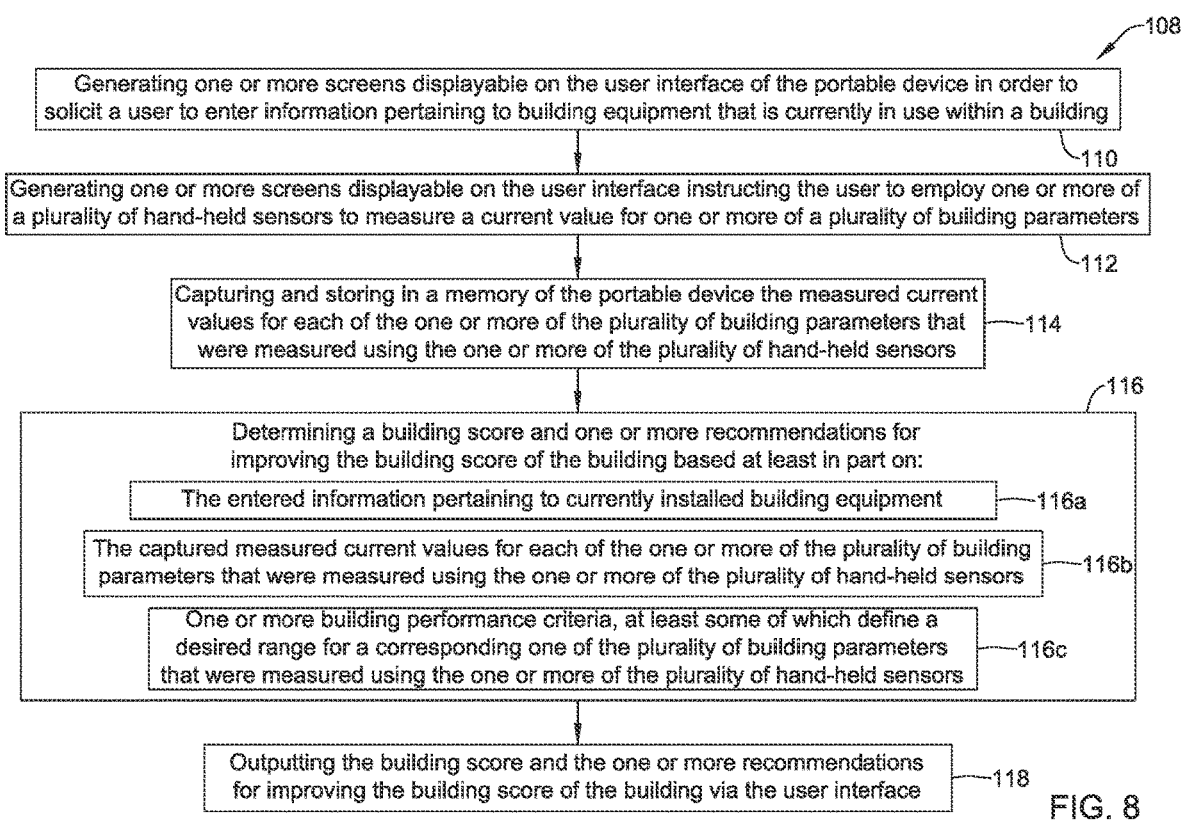
FIG. 8 is a flow diagram showing an illustrative method.

FIG. 8 is a flow diagram showing an illustrative method 108 that may be carried out using either the kit 10 or the system 82. One or more screens may be generated that are displayable on a user interface of the portable device in order to solicit a user to enter information pertaining to building equipment that is currently in use within a building, as indicated at block 110. One or more screens may be generated that are displayable on the user interface instructing the user to employ one or more of a plurality of hand-held sensors to measure a current value for one or more of a plurality of building parameters, as indicated at block 112. The measured current values for each of the one or more of the plurality of building parameters that were measured using the one or more of the plurality of hand-held sensors may be captured and stored in memory, as indicated at block 114. A building score and one or more recommendations for improving the building score of the building may be determined, as indicated at block 116.

The building score and the one or more recommendations may be based at least in part on the entered information pertaining to currently installed building equipment, as indicated at block 116a, the captured measured current values for each of the one or more of the plurality of building parameters that were measured using the one or more of the plurality of hand-held sensors, as indicated at block 116b and one or more building performance criteria, at least some of which define a desired range for a corresponding one of the plurality of building parameters that were measured using the one or more of the plurality of hand-held sensors, as indicated at block 116c. The building score and the one or more recommendations for improving the building score of the building may be outputted via the user interface.

In some cases, the building score and one or more recommendations may include a healthy building score and one or more one or more recommendations for improving the healthy building score of the building. The building score and one or more recommendations may include a building productivity score and one or more one or more recommendations for improving the building productivity score of the building. In some cases, the building score and one or more recommendations may include a building sustainability score and one or more one or more recommendations for improving the building sustainability score of the building.

FIG. 9 is a screen shot showing a simple example, in spreadsheet form, of determining a healthy building score that is based on both observations entered using a portable device 14, 86 as well as current values for particular healthy building parameters that were captured by the hand-held sensors 12, 84. FIG. 9 shows a screen 120 that includes a Pillar column 122 that lists out each the pillars being considered, such as Air Quality, Ventilation, Safety and Security, and Space Treatment. A Measure column 124 lists the particular healthy building parameters being considered for each of the pillars. The Measure column 124 includes, for each of the plurality of healthy building parameters, both a category describing whether the facility being evaluated is currently monitoring and/or managing that particular healthy building parameter, but also includes a category describing a current value for each healthy building parameter. At least some of the current values are determined using the hand-held sensors 12, 84, for example.

A Points column 126 lists out the possible points that can be awarded for each of the categories. A Readings column 128 provides current values for each of the healthy building parameters. A Score column 130 provides an actual score for each of the healthy building parameters. The actual score may be calculated by multiplying the current value as listed in the Readings column 128 or a numerical representation thereof by the possible score as listed in the Points column 126. The numerical representation may be the number "1" if the value provided in the Reading column 128 is a "yes" and may be the number 0" if the value provided in the Reading column 128 is a "no". The numerical representation may be the number "1" if the current value is within a desired range for that particular healthy building parameter, and may be the number "0" if the current value is not within the desired range for that particular healthy building parameter. In some cases, the numerical representation may be the number "1" if the current value is within a desired range for that particular healthy building parameter, and may be the number "0.5", or another number less than 1 and greater than 0, if the current value is outside the desired range but is within an acceptable range for that particular healthy building parameter.

A Pillar Score column 132 provides a total score for each of the pillars. A Pillar Rating column 134 provides another representation of the total score for each of the pillars. For example, the total pillar score for the Air Quality pillar is 40/40, as seen in the Pillar Score column 132, or a total of 5 stars, as seen in the Pillar Rating column 134. It will be appreciated that each of the columns 126, 128, 130, 132, 134 may be repeated within a spreadsheet for zone of a plurality of zones, if the building has more than one zone. For simplicity, FIG. 9 only shows results for a single zone.

The Pillar column 122 references an Air Quality section 136, a Ventilation section 138, a Safety & Security section 140 and a Space Treatment section 142. Looking at the Air Quality section 136, for example, it can be seen that this particular facility, at the time tested, got 9/9 points for monitoring relative humidity. This can mean that the facility has, at a minimum, a working relative humidity sensor. This may also mean that the facility includes the equipment necessary to actively change or control the relative humidity. Using one of the hand-held sensors 12, 84, the facility has a current relative humidity value of 50%. This is within the desired range of 40% to 60% relative humidity, so the facility is awarded 5/5 points for the current relative humidity value. While this may not indicate that the relative humidity within the facility is always within the desired range, the relative humidity within the facility, or within the portion of the facility in which the relative humidity was measured, is currently within the desired range.

Looking at the Ventilation section 138, it can be seen that the facility being evaluated has only scored 10 points out a possible 24 points, and has a 2 star rating. Looking at the specifics within the Measure column 124, it can be seen that the facility has been awarded 5/5 points for monitoring carbon dioxide levels and has been awarded 5/5 points for having a current carbon dioxide level, as measured using one of the hand-held sensors 12, 84, that is within the desired range. However, the facility has been awarded 0/7 points because the facility is not monitoring and/or managing a ventilation rate. Moreover, the facility has been awarded 0/7 points because the determined ventilation rate of 1 air change per hour is below the desired minimum of 2 air changes per hour.

Looking at the Safety & Security section 140, the facility being tested has scored fairly well, only losing points for not monitoring crowding incidents in which people do not pay attention to social distancing guidelines. Looking at the Space Treatment section 142, the facility being tested has scored 5/5 points for having installed an Electronic Air Cleaner (EAC) as well as a UV light such as but not limited to a UVC light. The facility gets no points for Surface UVC or for Needle Point Ionization. Altogether, the facility has an overall score of 94 points out of a possible 125 points, and has received a 4 star rating. One recommendation that could improve the healthy building score for this facility, as can be seen, would be to recommend adding the appropriate equipment to monitor and manage appropriate ventilation rates that would yield at least 2 air changes per hour.

An additional recommendation would be to install equipment that would utilize UVC to sterilize surfaces. UV light may produce light that falls within a spectrum of about 100 nanometers (nm) to about 400 nm. This UV light spectrum includes UV-A, which ranges from 315 nm to 400 nm. This UV light spectrum also includes UV-B, which ranges from 280 nm to 315 nm. UV-C, which ranges from 200 nm to 280 nm, is particularly effective for disinfecting. There is also Far-UVC, which ranges from 207 nm to 222 nm and thus is a subset of the UV-C light spectrum. Far-UVC is also particularly effective for disinfecting, and is believed to be safe for human skin and eyes. The UV light spectrum also includes VUV Far-UV, which ranges from 100 nm to 200 nm.

Another recommendation would be to install Needle Point Ionization. Needlepoint bipolar ionization is a commercially available technology that produces a stream of ions that can capture gaseous and particulate contaminants in the air, including volatile organic compounds (VOCs) and odors. Negative and positive ions are produced when electricity is applied to a tube with two electrodes, and which in turn react with water vapor and oxygen in the air to create free radicals. The free radicals can kill microorganisms and break down odors, improving indoor air quality, for example.

While a healthy building score is used in this example, a similar approach may be used to compute a building sustainability score and/or a building productivity score. This may be useful to present the often complex interrelated and competing nature of various building performance factors of a building. For example, a facility manager may indicate that building sustainability (e.g. energy usage) should be prioritized over building productivity and healthy building objectives, and thus may be willing to accept a lower building productivity score and a lower healthy building score to achieve a high building sustainability score. In other cases, the facility manager may indicate that healthy building objectives should be prioritized over building sustainability and building productivity during a pandemic, and thus may be willing to accept a lower building sustainability score and a lower building productivity score to achieve a high healthy building score. In some cases, this tradeoff may be time dependent. For example, the facility manager may priorities building sustainability (e.g. energy usage) during unoccupied time periods and building productivity and/or healthy building objectives during occupied time periods. These are just examples.

Figure 10:
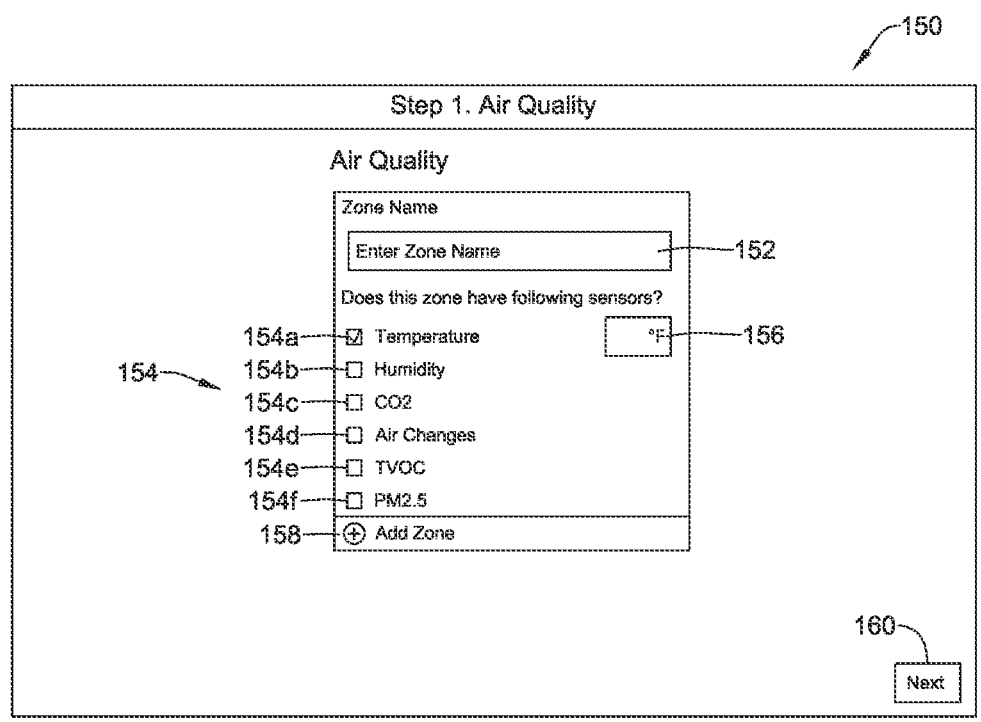

FIGS. 10 through 14 provide screen shots that may be generated when using the portable device 14, 86 to evaluate a building to ascertain its healthy building performance. FIG. 10 provides a screen 150 that may be displayed by the portable device 14, 86 when a user is evaluating air quality. The screen 150 includes a box 152 that allows a user to enter a name of a particular zone. The screen 150 includes a number of check boxes 154 that allow a user to indicate which sensors are already in use within the named zone. The check boxes 154 include a temperature check box 154a, a humidity check box 154b, a CO2 check box 154c, an Air Changes check box 154d, a TVOC check box 154e and a PM2.5 check box 154f. As indicated, the user has checked the temperature check box 154a, indicating that the named zone includes at least one temperature sensor. A box 156 allows the user to enter a current temperature value as obtained by using an appropriate one of the plurality of hand-held sensors 12, 84. In some cases, additional boxes may be displayed in order to allow entry of other healthy building parameters measured by one of the hand-held sensors 12, 84, even if the named zone does not currently include an installed sensor of that type. An ADD ZONE button 158 allows a user to enter information for an additional zone. A NEXT button 160 allows a user to move to a subsequent screen. While not shown, in some cases the screen 150 may include a CANCEL or BACK button that allows the user to move back to a previously displayed screen.

Figure 11:

FIG. 11 provides a screen 170 that may be displayed by the portable device 14, 86 when a user is evaluating safety and security compliance. It will be appreciated that while air quality measurements may take place anywhere within the facility, safety and security compliance may be tied to a particular location, such as an entrance or other access point. The screen 170 includes a box 172 that indicates a particular access point, in this case, the "East Entrance". A photo icon 174 allows a user to take a picture of the particular location, should they desire to do so. The screen 170 includes a section 176 that allows a user to specify which of the safety and security compliance categories the facility monitors automatically. The section 176 includes a Mask and PPE check box 176a, an Elevated Body Temperature check box 176b, an Occupancy Level check box 176c and a Social Distancing check box 176d.

As illustrated, the user has checked the Mask and PPE check box 176a. Accordingly, the screen 170 includes a counter 178 that the user can increment or decrement in order to indicate how many devices are being used to monitor Mask and PPE compliance, a counter 180 that the user can increment or decrement in order to indicate how many incidents have been detected in a day (or other suitable time frame), and a box 182 in which the user can indicate what technology is being used to monitor Mask and PPE compliance. The screen 170 includes an Add Access Point button 184 that allows a user to enter information for an additional access point. A NEXT button 186 allows a user to move to a subsequent screen. While not shown, in some cases the screen 170 may include a CANCEL or BACK button that allows the user to move back to a previously displayed screen.

FIG. 12 provides a screen 190 that may be displayed by the portable device 14, 86 when a user is providing information as to how compliance is being monitored. The screen 190 includes a monitoring section 192 that solicits information as to how monitoring is achieved, and includes an Integrated Overview Dashboard check box 192a, a Locally check box 192b and a Not Monitored check box 192c. In this example, the user has selected the Locally check box 192b. The screen 190 also includes an action section 194 that solicits information as to what action is taken when a compliance issue is detected via monitoring. The action section 194 includes a Fully Automated check box 194a, a Semi Automated check box 194b and a Manual Intervention check box 194c. As shown, the user has selected the Manual Intervention check box 194c. The screen 190 also includes a SUBMIT button 196 that may be used to submit the entered information.

Figure 13:
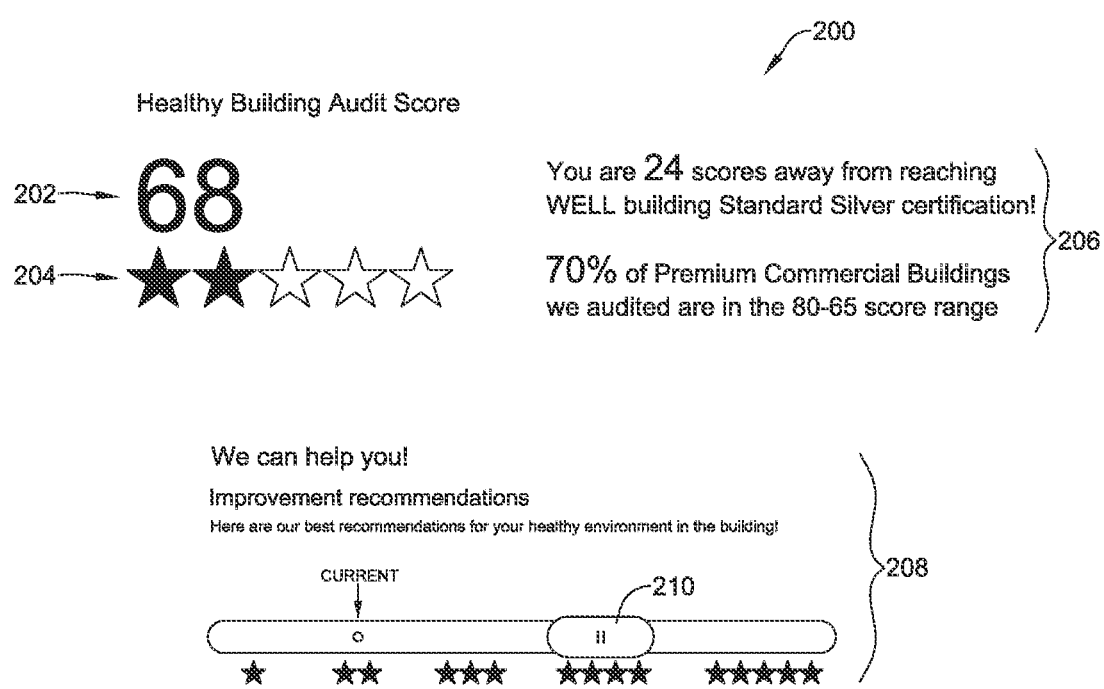

FIG. 13 provides a screen 200 that may be displayed by the portable device 14, 86, informing the user of the Healthy Building Audit Score for their facility. It will be appreciated that the screen 200 does not reflect the numbers shown in the example illustrated in FIG. 9. In this example, the screen 200 displays an overall score 202 that reads "68" and a star rating 204 that reads "2 stars", indicating that the particular building could certainly improve its performance. The screen 200 includes a section 206 that compares the current performance to the scores needed to achieve a WELL building Standard Silver certification, for example, as well as a comparison to similar buildings. The screen 200 also includes a recommendations section 208 that shows the user particular recommendations to achieve a desired star rating, as selected by the user by moving a slider 210. The use can move the slider 210 to see recommendations that would allow their facility to achieve, instead of its current 2 star rating, a three star rating, a four star rating or even a five star rating.

Figure 14:
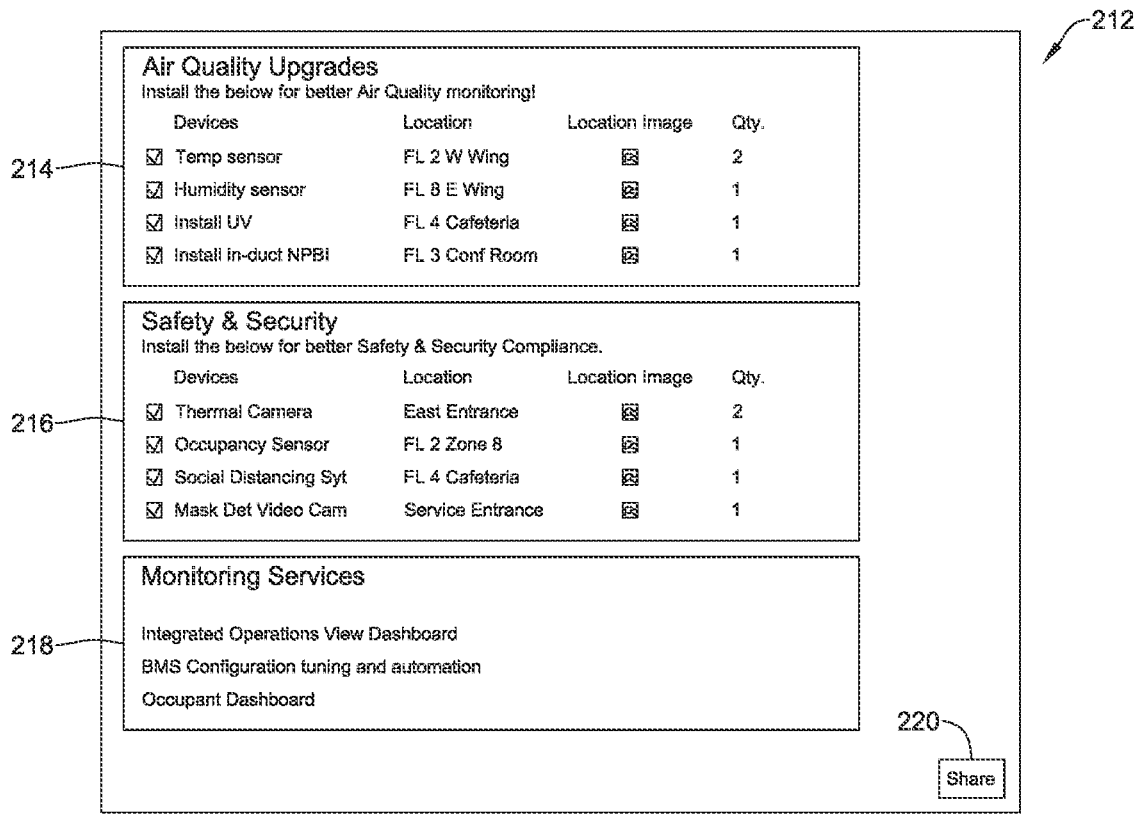

FIG. 14 provides a screen 212 that includes an Air Quality section 214, a Safety & Security section 216 and a Monitoring Services section 218. The Air Quality section 214 includes a list of recommended new equipment as well as an indication of where each new piece of equipment should be installed for optimal results. Similarly, the Safety & Security section 216 includes a list of recommended new equipment as well as an indication of where each new piece of equipment should be installed for optimal results. The Monitoring Services section 218 provides a list of available monitoring services that could be chosen by the facility in order to improve its performance.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A kit for ascertaining a current healthy building performance of a building and determining recommendations for improving the healthy building performance of the building, the healthy building performance based upon a plurality of healthy building criteria each defining a desired range for a corresponding healthy building parameter, the kit comprising:

a plurality of hand-held sensors that are each configured to provide a current value of one or more of the healthy building parameters;

a portable device that includes a user interface, a memory and a processor operably coupled to the user interface and to the memory, the processor configured to:

generate one or more screens displayable on the user interface that solicit a user to enter information pertaining to healthy building equipment that is currently in use within the building;

generate one or more screens displayable on the user interface instructing the user to employ one or more of the plurality of hand-held sensors to measure a current value of one or more of the healthy building parameters;

capture and store in the memory the measured current values of the one or more of the healthy building parameters that were measured using the one or more of the plurality of hand-held sensors, wherein capturing at least one of the measured current values of the one or more of the healthy building parameters includes:

establishing a wireless communication between the portable device and at least one of the plurality of hand-held sensors;

communicating the measured current value from each of the at least one of the plurality of hand-held sensors to the portable device via the established wireless communication;

determine a healthy building score and one or more recommendations for improving the healthy building score of the building based at least in part on:

the entered information pertaining to currently installed healthy building equipment;

the captured measured current values for each of the one or more of the healthy building parameters that were measured using the one or more of the plurality of hand-held sensors;

the plurality of healthy building criteria; and output the healthy building score and the one or more recommendations for improving the healthy building score of the building via the user interface.

2. The kit of claim 1, wherein the processor is configured to perform the capturing step and the determining step for each zone of a plurality of zones within the building.

3. The kit of claim 2, wherein the processor is configured to determine a healthy building score that represents a compilation of a healthy building score for each zone of the plurality of zones.

4. The kit of claim 2, wherein the processor is configured to determine the one or more recommendations for improving the healthy building score by aggregating recommendations for improving the healthy building score for each zone of the plurality of zones.

5. The kit of claim 1, wherein capturing the measured current values of the one or more of the healthy building parameters that were measured using the one or more of the plurality of hand-held sensors comprises:

generating and displaying one or more screens on the user interface instructing the user to enter the measured current values from at least one of the one or more of the plurality of hand-held sensors;

accepting the inputted values; and storing the inputted values to the memory.

6. The kit of claim 1, wherein one of the plurality of hand-held sensors comprises a humidity sensor and/or a temperature sensor.

7. The kit of claim 1, wherein one of the plurality of hand-held sensors comprises a particulate matter sensor.

8. The kit of claim 1, wherein one of the plurality of hand-held sensors comprises a carbon dioxide sensor.

9. The kit of claim 1, wherein one of the plurality of hand-held sensors comprises a volatile organic sensor configured to measure a concentration of volatile organic compounds.

10. The kit of claim 1, wherein the processor is configured to display one or more screens on the user interface soliciting the user to enter information pertaining to an estimate of a current outside air ventilation rate for the building.

11. The kit of claim 1, wherein the processor is configured to display one or more screens on the user interface soliciting the user to enter information regarding occupancy levels.

12. The kit of claim 1, wherein the processor is configured to display one or more screens on the user interface soliciting the user to enter information regarding compliance with a mask standard.

13. The kit of claim 1, wherein the processor is configured to display one or more screens on the user interface soliciting the user to enter information regarding compliance with a body temperature standard.

14. The kit of claim 1, wherein the information pertaining to healthy building equipment that is currently in use within the building includes whether the building currently has one or more of a humidity sensor, a humidifier and/or a dehumidifier.

15. The kit of claim 1, wherein the information pertaining to healthy building equipment that is currently in use within the building includes whether the building currently has one or more of an Indoor Air Quality (IAQ) sensor, fresh air ventilation capability, and air filtration capability.

16. A system for ascertaining a current healthy building performance of a building and making recommendations for improving the healthy building performance of the building, the healthy building performance based upon a plurality of healthy building criteria each defining a desired range for a corresponding healthy building parameter, the building including a plurality of zones, the system comprising:

a plurality of hand-held sensors that are each configured to provide a measure of a current value for one of the plurality of healthy building criteria;

a portable device that includes a user interface, a memory and a processor operably coupled to the user interface and to the memory, the processor configured to:

generate one or more screens displayable on the user interface in order to solicit a user to enter information pertaining to healthy building equipment that is currently in use within the building;

generate one or more screens displayable on the user interface instructing the user to employ one or more of the plurality of hand-held sensors to measure a current value of one or more of the healthy building parameters within each zone of the plurality of zones of the building;

capture and store in the memory the measured current values of the one or more of the healthy building parameters that were measured for each of the plurality of zones using the one or more of the plurality of hand-held sensors, wherein capturing at least one of the measured current values of the one or more of the healthy building parameters includes:

establishing a wireless communication between the portable device and at least one of the plurality of hand-held sensors;

communicating the measured current value from each of the at least one of the plurality of hand-held sensors to the portable device via the established wireless communication;
determine a healthy building score for each of the plurality of zones based at least in part on:
the entered information pertaining to currently installed healthy building equipment;
the captured measured current values for each of the one or more of the healthy building parameters that were measured for the corresponding one of the plurality of zones;
the plurality of healthy building criteria; and
aggregating the healthy building score for each of the plurality of zones to determine an aggregate healthy building score for the building; and
displaying via the user interface a dashboard that provides the aggregated healthy building score for the building.

17. The system of claim 16, wherein the dashboard is configured to display each of the healthy building score for each of the plurality of zones.

18. A non-transient, computer-readable storage medium having stored thereon instructions that when executed by one or more processors of a portable device, causes the one or more processors to:
generate one or more screens displayable on a user interface of the portable device in order to solicit a user to enter information pertaining to building equipment that is currently in use within a building;
generate one or more screens displayable on the user interface instructing the user to employ one or more of a plurality of hand-held sensors to measure a current value for one or more of a plurality of building parameters;
capture and store in a memory of the portable device the measured current values for each of the one or more of the plurality of building parameters that were measured using the one or more of the plurality of hand-held sensors, wherein capturing at least one of the measured current values of the one or more of the healthy building parameters includes:
establishing a wireless communication between the portable device and at least one of the plurality of hand-held sensors;
communicating the measured current value from each of the at least one of the plurality of hand-held sensors to the portable device via the established wireless communication;
determine a building score and one or more recommendations for improving the building score of the building based at least in part on:
the entered information pertaining to currently installed building equipment;
the captured measured current values for each of the one or more of the plurality of building parameters that were measured using the one or more of the plurality of hand-held sensors;
one or more building performance criteria, at least some of which define a desired range for a corresponding one of the plurality of building parameters that were measured using the one or more of the plurality of hand-held sensors; and
output the building score and the one or more recommendations for improving the building score of the building via the user interface.

19. The non-transient, computer-readable storage medium of claim 18, wherein the building score and one or more recommendations include one or more of:
a healthy building score and one or more one or more recommendations for improving the healthy building score of the building;
a building productivity score and one or more one or more recommendations for improving the building productivity score of the building; and
a building sustainability score and one or more one or more recommendations for improving the building sustainability score of the building.

* * * * *